(12) United States Patent
Rodriguez et al.

(10) Patent No.: US 12,516,216 B2
(45) Date of Patent: Jan. 6, 2026

(54) MICROBALLOON-FACILITATED TUNABLE POROSITY OF ELASTOMERIC SHAPE MEMORY POLYMER COMPOSITES

(71) Applicants: Lawrence Livermore National Security, LLC, Livermore, CA (US); Honeywell Federal Manufacturing & Technologies, LLC., Kansas City, MO (US)

(72) Inventors: Jennifer Nicole Rodriguez, Lathrop, CA (US); Eric B. Duoss, Dublin, CA (US); Alexandra Golobic, Pleasanton, CA (US); Jeremy M. Lenhardt, Tracy, CA (US); Lemuel Perez Perez, Livermore, CA (US); Ward Small, IV, Livermore, CA (US); Thomas S. Wilson, San Leandro, CA (US); Amanda Wu, Dublin, CA (US); Timothy Dexter Yee, Alameda, CA (US); Stephanie Schulze, Lenexa, KS (US)

(73) Assignees: Lawrence Livermore National Security, LLC, Livemore, CA (US); Honeywell Federal Manufacturing & Technologies, LLC., Kansas City, MO (US)

( * ) Notice: Subject to any disclaimer, the term of this patent is extended or adjusted under 35 U.S.C. 154(b) by 1094 days.

(21) Appl. No.: 17/522,677

(22) Filed: Nov. 9, 2021

(65) Prior Publication Data
US 2022/0064481 A1 Mar. 3, 2022

Related U.S. Application Data

(63) Continuation-in-part of application No. 16/610,215, filed as application No. PCT/US2018/039857 on Jun. 27, 2018, now Pat. No. 11,866,594.

(Continued)

(51) Int. Cl.
*C09D 183/04* (2006.01)
*B33Y 70/00* (2020.01)
(Continued)

(52) U.S. Cl.
CPC ............ *C09D 183/04* (2013.01); *B33Y 70/00* (2014.12); *B33Y 80/00* (2014.12); *C09D 7/70* (2018.01);
(Continued)

(58) Field of Classification Search
CPC ..................................................... B29C 64/118
See application file for complete search history.

(56) References Cited

U.S. PATENT DOCUMENTS

| 3,917,526 A | 11/1975 | Jennings |
| 4,582,756 A | 4/1986 | Niinuma et al. |

(Continued)

FOREIGN PATENT DOCUMENTS

| GB | 990235 A | 4/1965 |
| WO | 2006086011 A2 | 8/2006 |

(Continued)

OTHER PUBLICATIONS

"Comparison of compressive properties of layered syntactic foams having gradient in microballoon volume fraction and wall thickness," Gupta et al., Materials Science and Engineering A 427 (2006) 331-342. (Year: 2006).*

(Continued)

*Primary Examiner* — Ian A Rummel
(74) *Attorney, Agent, or Firm* — Zilka-Kotab, P.C.

(57) ABSTRACT

A product includes a porous three-dimensional printed structure having printed filaments arranged in a geometric pattern. The printed filaments include a material having a plurality of gas-filled microballoons. The printed structure has hierarchical porosity including an inter-filament porosity (Continued)

defined by the arrangement of the printed filaments, and an intra-filament porosity of the material. The intra-filament porosity is defined by the plurality of gas-filled microballoons in the material of the printed filament.

7 Claims, 16 Drawing Sheets

Related U.S. Application Data

(60) Provisional application No. 62/525,493, filed on Jun. 27, 2017.

(51) Int. Cl.
| | |
|---|---|
| *B33Y 80/00* | (2015.01) |
| *C09D 7/40* | (2018.01) |
| *B29C 64/118* | (2017.01) |
| *B29K 83/00* | (2006.01) |
| *B33Y 10/00* | (2015.01) |

(52) U.S. Cl.
CPC ......... *B29C 64/118* (2017.08); *B29K 2083/00* (2013.01); *B33Y 10/00* (2014.12)

(56) References Cited

U.S. PATENT DOCUMENTS

| | | | |
|---|---|---|---|
| 4,906,518 | A | 3/1990 | Inabata |
| 8,097,336 | B2 | 1/2012 | Owens |
| 8,883,871 | B2 | 11/2014 | Wilson et al. |
| 9,340,654 | B2 | 5/2016 | Silverstein et al. |
| 10,494,470 | B2 | 12/2019 | Wilson et al. |
| 10,689,491 | B2 | 6/2020 | Durban et al. |
| 11,866,594 | B2 | 1/2024 | Wu et al. |
| 2004/0126322 | A1 | 7/2004 | Bichon et al. |
| 2012/0252324 | A1 | 10/2012 | Hreha et al. |
| 2015/0174826 | A1 | 6/2015 | Murugesh et al. |
| 2019/0100626 | A1 | 4/2019 | Durban et al. |
| 2019/0241684 | A1 | 8/2019 | Tsujino et al. |
| 2019/0329491 | A1* | 10/2019 | Yu .................. B29C 64/165 |
| 2020/0109300 | A1 | 4/2020 | Wu et al. |
| 2020/0190345 | A1 | 6/2020 | Mabe et al. |
| 2020/0308428 | A1 | 10/2020 | Perez et al. |
| 2021/0269659 | A1 | 9/2021 | Nguyen et al. |
| 2021/0324217 | A1 | 10/2021 | Mabe et al. |

FOREIGN PATENT DOCUMENTS

| | | | |
|---|---|---|---|
| WO | 2006136153 | A1 | 12/2006 |
| WO | 2016149032 | A1 | 9/2016 |
| WO | 2016187097 | A1 | 11/2016 |
| WO | 2017086923 | A1 | 5/2017 |

OTHER PUBLICATIONS

Notice of Allowance from U.S. Appl. No. 16/610,215, dated Oct. 20, 2023.
Perez et al., U.S. Appl. No. 16/368,725, filed Mar. 28, 2019.
Perez et al., U.S. Appl. No. 17/499,641, filed Oct. 12, 2021.
Nguyen et al., U.S. Appl. No. 16/805,494, filed filed Feb. 28, 2020.
Mabe et al., U.S. Appl. No. 17/232,521, filed Apr. 16, 2021.
Lenhardt et al., U.S. Appl. No. 17/075,549, filed Oct. 20, 2020.
Lerebours et al., "The relationship between porosity and specific surface in human cortical bone is subject specific," Bone, vol. 72, 2015, pp. 109-117.
Drake, E., "Characterization of Viscoelastic Materials Through an Active Mixer by Direct-Ink Writing," Thesis, Oklahoma State University, May 2017, 117 pages.
Wu et al., "3D Printed Silicones with Shape Memory," Scientific Reports, Jul. 2017, 6 pages.
Shi et al., "Design and fabrication of graduated porous Ti-based alloy implants for biomedical applications," Journal of Alloys and Compounds, vol. 728, 2017, pp. 1043-1048.
Onal et al., "Mechanical Properties and In Vitro Behavior of Additively Manufactured and Functionally Graded Ti6Al4V Porous Scaffolds," Metals, vol. 8, 2018, pp. 1-21.
Ortega et al., "Active Mixing of Disparate Inks for Multimaterial 3D Printing," Advanced Materials Technologies, vol. 4, 2019, 13 pages.
Chen et al., "Porous Scaffold Design for Additive Manufacturing in Orthopedics: A Review," Frontiers in Bioengineering and Biotechnology, vol. 8, Jun. 2020, pp. 1-20.
Shalchy et al., "Hierarchical porosity in additively manufactured bioengineering scaffolds: Fabrication & characterisation," Journal of the Mechanical Behavior of Biomedical Materials, vol. 110, 2020, 12 pages.
Smay et al., "Collodial Inks for Directed Assembly of 3-D Periodic Structures," Langmuir, vol. 18, No. 14, 2002, pp. 5429-5437.
Beloshenko et al., "Shape-Memory Effect in Polymer Composites with a Compactible Filler," Mechanics of Composite Materials, vol. 39, No. 3, 2003, pp. 255-264.
Gratson et al., "Phase Behavior and Rheological Properties of Polyelectrolyte Inks for Direct-Write Assembly," Langmuir, vol. 21, No. 01, 2005, pp. 457-464.
Lewis, J., "Direct Ink Writing of 3D Functional Materials," Advanced Functional Materials, vol. 16, 2006, pp. 2193-2204.
Therriailt et al., "Fugitive Inks for Direct-Write Assembly of Three-Dimensional Microvascular Networks," Advanced Materials, vol. 17, No. 4, Feb. 23, 2005, pp. 395-399.
Liu et al., "Review of progress in shape-memory polymers," Journal of Materials Chemistry, vol. 17, Mar. 19, 2007, pp. 1543-1558.
Small et al., "Biomedical applications of thermally activated shape memory polymers," Journal of Materials Chemistry, vol. 20, Mar. 2, 2010, pp. 3356-3366.
Cai et al., "Direct-writing construction of layered meshes from nanoparticles-vaseline composite inks: rheological properties and structures," Applied Physics A: Materials and Science Processing, vol. 102, 2011, pp. 501-507.
Hearon et al., "Post-Polymerization Crosslinked Polyurethane Shape Memory Polymers," Journal of Applied Polymer Science, vol. 121, Feb. 17, 2011, pp. 144-153.
Singhal et al., "Ultra Low Density and Highly Crosslinked Biocompatible Shape Memory Polyurethane Foams," Journal of Polymer Science Part B: Polymer Physics, vol. 50, No. 10, May 15, 2012. pp. 1-27.
Song et al., "Design and characterization of biocompatible shape memory polymer (SMP) blend foams with a dynamic porous structure," Polymer, vol. 56, 2015, pp. 82-92.
Damouny et al., "Hydrogel-filled, semi-crystalline, nanoparticle-crosslinked, porous polymers from emulsion templating: Structure, properties, and shape memory," Polymer, vol. 82, 2016, pp. 262-273.
Wang et al., "Recent developments in shape memory polymer nanocomposites: Actuation methods and mechanisms," Coordination Chemistry Reviews, vol. 320-321, Mar. 25, 2016, pp. 38-52.
Maiti et al., "3D printed cellular solid outperforms traditional stochastic foam in long-term mechanical response," Scientific Reports, vol. 6:24871, Apr. 27, 2016, pp. 1-8.
Duoss et al., "Three-Dimensional Printing of Elastomeric, Cellular Architectures with Negative Stiffness," Advanced Functional Materials, vol. 24, 2014, pp. 4905-4913.
Hearon et al., "Porous Shape-Memory Polymers," Polymer Reviews, vol. 53, 2013, pp. 41-75.
Singhal et al., "Ultra Low Density Amorphous Shape Memory polymer Foams," American Chemical Society, Mar. 19, 2012, 4 pages.
Therriault et al., "Rheological Behavior of Fugitive Organic Inks for Direct-Write Assembly," Applied Rheology, vol. 17, Issue. 01, 2007, pp. 10112:1-10112:8.
Zhang et al., "Mechanical, thermal insulation, thermal resistance and acoustic absorption properties of geopolymer foam concrete (GFC)," Cement and Concrete Composites, vol. 62, 2015, 35 pages, retrieved from http://eprints.whiterose.ac.uk/90607/1/Zhang%20et%20al.%20CCC%202015%20for%20WRRO.pdf.

(56) References Cited

OTHER PUBLICATIONS

Rodriguez et al., "In vivo tissue response following implantation of shape memory polyurethane foam in a porcine aneurysm," Journal of Biomedical Materials Research A, vol. 102. No. 5, May 2014, pp. 1-22.
Nam et al., "A Novel Fabrication Method of Macroporous Biodegradable Polymer Scaffolds Using Gas Foaming Salt as a Porogen Additive," John Wiley & Sons Inc., Journal of Biomedical Materials Research, vol. 53, 2000, pp. 1-7.
Muth et al., "Embedded 3D Printing of Strain Sensors within Highly Stretchable Elastomers," Advanced Materials, vol. 26, 2014, pp. 6307-6312.
Wehner et al., "An integrated design and fabrication strategy for entirely soft, autonomous robots," Nature, vol. 536, Aug. 25, 2016, pp. 451-455.
Gladman et al., "Biomimetic 4D printing," Nature Materials, vol. 15, Apr. 2016, pp. 413-418.
Javey et al., "Layer-by Layer Assembly of Nanowires for Three-Dimensional, Multifunctional Electronics," Nanoletters, vol. 07, No. 03, 2007, pp. 773-777.
Kim et al., "Stretchable and Foldable Silicon Integrated Circuits," Science, vol. 320, Apr. 25, 2008, pp. 507-511.
Liu et al., "Three-dimensional photonic metamaterials at optical frequencies," Nature Materials, vol. 07, Jan. 2008, pp. 31-37.
Ge et al., "Multimaterial 4D Printing with Tailorable Shape Memory Polymers," Scientific Reports, vol. 6:31110, Aug. 8, 2016, pp. 1-11.
Khoo et al., "3D printing of smart materials: A review on recent progresses in 4D printing," Virtual and Physical Prototyping, vol. 10, No. 03, 2015, pp. 103-122.
Jang et al., "Fabrication and deformation of three-dimensional hollow ceramic nanostructures," Nature Materials, vol. 12, Oct. 2013, pp. 893-898.
Meza et al., "Strong, lightweight, and recoverable three-dimensional ceramic nanolattices," Science, vol. 345, Issue. 6202, Sep. 12, 2014, pp. 1322-1326.
Bauer et al., "High-strength cellular ceramic composites with 3D microarchitecture," Proceedings of the National Academy of Sciences, vol. 111, No. 07, Feb. 18, 2014, pp. 2453-2458.
Zheng et al., "Ultralight, Ultrastiff Mechanical Metamaterials," Science, vol. 344, Issue 6190, Jun. 20, 2014, pp. 1373-1377.
Meza et al., "Resilient 3D hierarchical architected metamaterials," Proceedings of the National Academy of Sciences: Early Edition, Sep. 2015, pp. 1-6.
Zhu et al., "Catenary shape evolution of spanning structures in direct-write assembly of colloidal gels," Journal of Materials Processing Technology, vol. 212, 2012, pp. 727-733.
Lewis et al., "Direct writing in three dimensions," Materials Today, Jul.-Aug. 2004, pp. 32-39.
Wilson et al., "Shape memory polymers based on uniform aliphatic urethane networks," Journal of Applied Polymer Science, Jan. 23, 2007, 36 pages, retrieved from https://www.semanticscholar.org/paper/Shape-memory-polymers-based-on-uniform-aliphatic-Wilson-Bearinger/f494e9e9c50c034807ca437ab254b0dacd179e08.
Wagner et al., "Shear thickening in colloidal dispersions," Physics Today, vol. 62, No. 10, Oct. 2009, pp. 27-32.
Lewis et al., "Well-Defined Shape-Memory Networks with High Elastic Energy Capacity," Macromolecules, vol. 48, Jul. 15, 2015, pp. 4918-4926.
Wu et al., U.S. Appl. No. 16/610,215, filed Nov. 1, 2019.
Zheng et al., "Multiscale metallic metamaterials," Nature Materials, 2016, pp. 1-26.
International Search Report and Written Opinion from PCT Application No. PCT/US2018/039857, dated Nov. 5, 2018.
International Preliminary Report from PCT Application No. PCT/US2018/039857, dated Jan. 9, 2020.
Lendlein et al., "Shape-Memory Effect," Angewandte Chemie International Ed., vol. 41, 2002, pp. 2034-2057.
Ohki et al., "Mechanical and shape memory behavior of composites with shape memory polymer," Composites: Part A 35, 2004, pp. 1065-1073.
Lendlein et al., "Biodegradable, Elastic Shape-Memory Polymers for Potential Biomedical Applications," Science, vol. 296, May 31, 2002, pp. 1673-1676.
Li et al., "Thermomechanical characterization of a shape memory polymer based self-repairing syntactic foam," Polymer, vol. 51, 2010, pp. 755-762.
Shimazaki et al., "Shock-absorption properties of functionally graded EVA laminates for footwear design," Polymer Testing, vol. 54, 2016, pp. 98-103.
Mabe et al, U.S. Appl. No. 16/659,025, filed Oct. 21, 2019.
Durban et al., U.S. Appl. No. 15/721,528, filed Sep. 29, 2017.
Non-Final Office Action from U.S. Appl. No. 16/610,215, dated Mar. 1, 2023.

\* cited by examiner

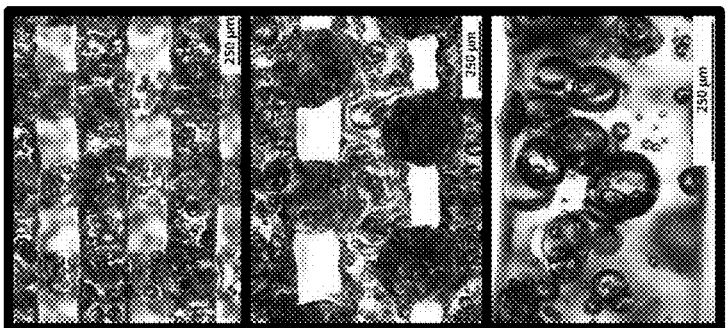
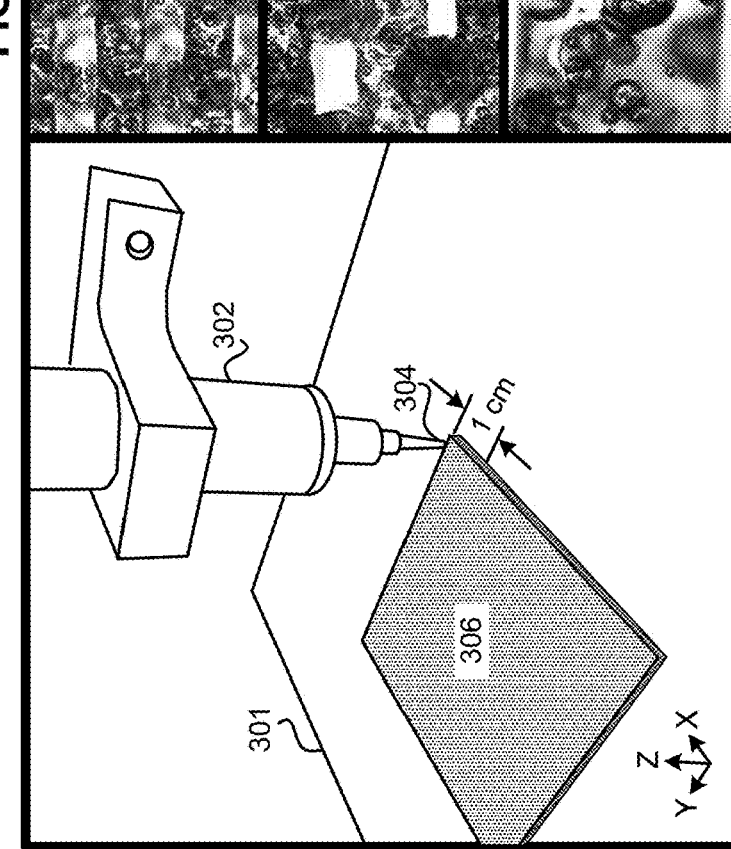
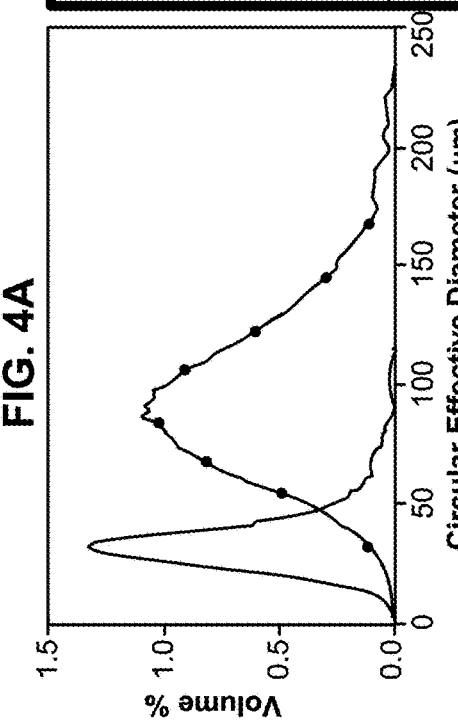
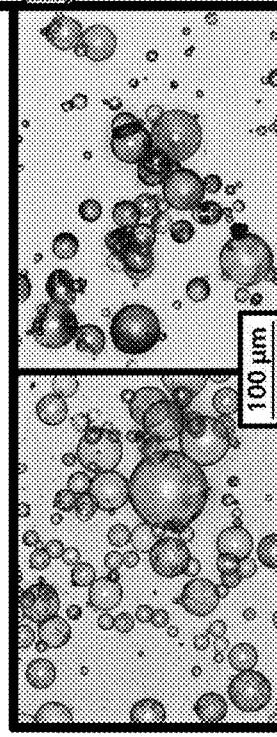
FIG. 4A  FIG. 4B  FIG. 4C  FIG. 4D  FIG. 4E  FIG. 4F (middle)  FIG. 4G (bottom)

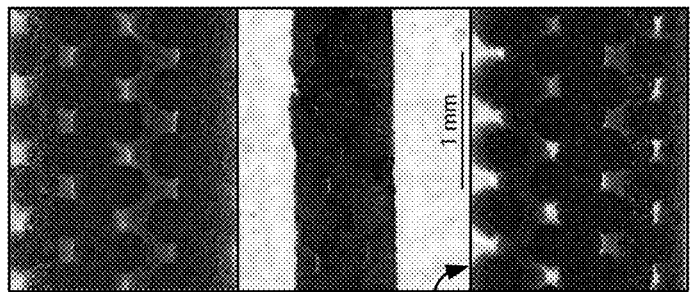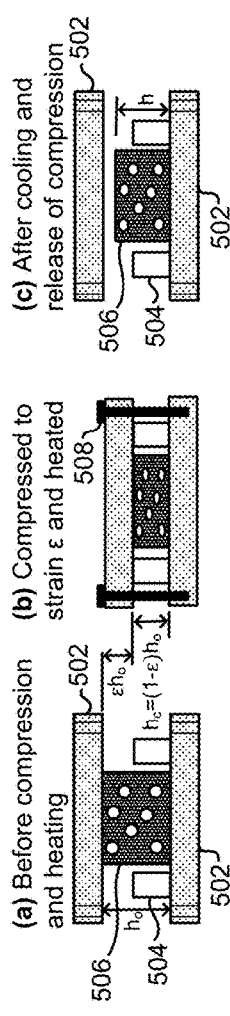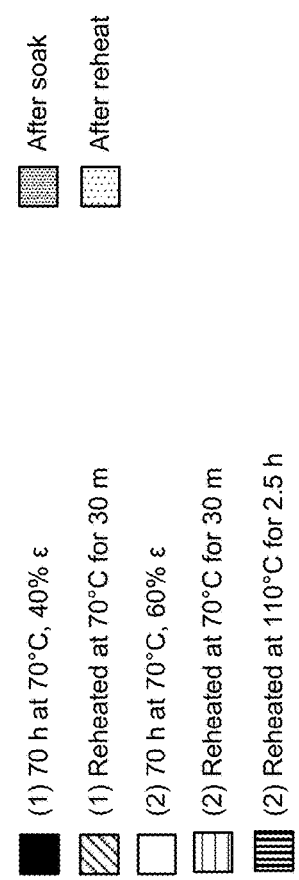
FIG. 6A
FIG. 6B
FIG. 6C
FIG. 6D
FIG. 6E (middle)
FIG. 6F (bottom)

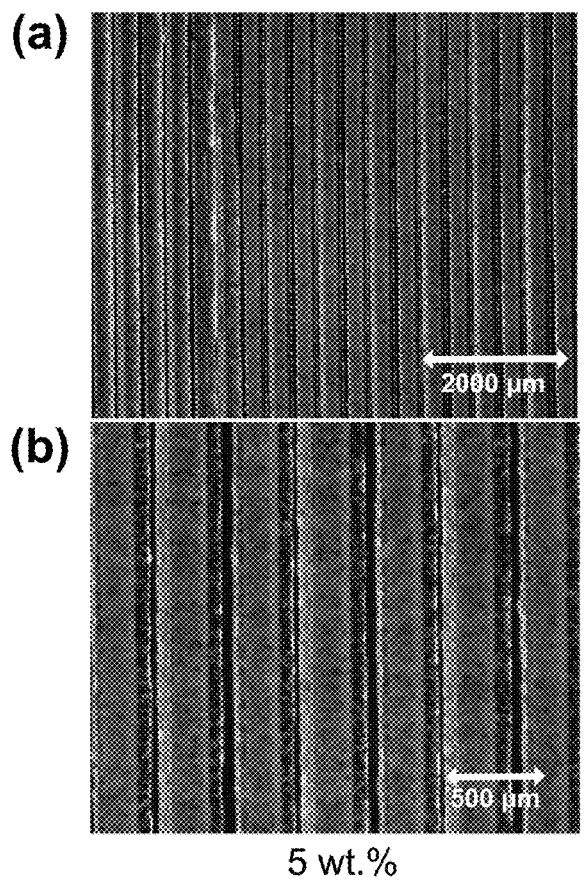
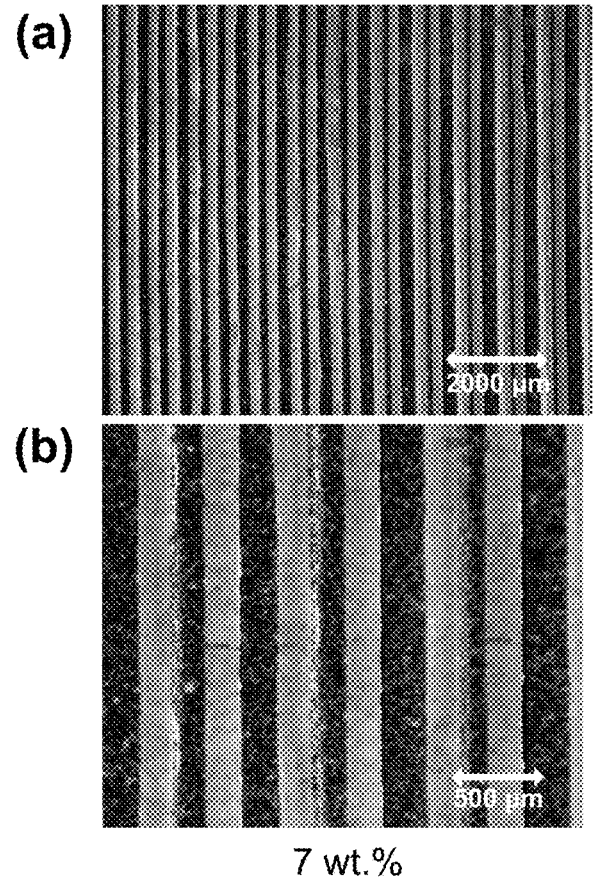
FIG. 13A            FIG. 13B

MICROBALLOON-FACILITATED TUNABLE POROSITY OF ELASTOMERIC SHAPE MEMORY POLYMER COMPOSITES

RELATED APPLICATIONS

This application is a Continuation in Part of U.S. patent application Ser. No. 16/610,215 filed Nov. 1, 2019, and claims priority to International Application No. PCT/US2018/039857, filed Jun. 27, 2018, each of which is herein incorporated by reference. This application claims the benefit of U.S. Provisional Patent Application No. 62/525,493, filed Jun. 27, 2017, which is incorporated herein by reference.

This invention was made with Government support under Contract No. DE-AC52-07NA27344 awarded by the United States Department of Energy. The Government has certain rights in the invention.

FIELD OF THE INVENTION

The present invention relates to elastomers, and more particularly, this invention relates to elastomers embedded with gas-filled polymer microballoons.

BACKGROUND

Process development and fabrication of stochastic elastomeric foams is driven by diverse applications requiring advanced structural performance facilitated by both closed cells (e.g., shock absorption, acoustic damping and thermal insulation) and open cells (e.g., biocompatible membranes, tissue engineering scaffolds, semi-permeable membranes for materials separation and food processing).

However, stochastic foams may not provide long-term mechanical performance because stochastic foams tend to result in higher local stress concentrations which thereby result in localized material failure. It would be desirable to create ordered porous structures that are predictable, reproducible, and have potential for architectural complexity.

A three dimensional (3D) printing process, also known as direct ink writing (DIW), can form layer-by-layer manufacture of ordered, porous structures whose mechanical behavior is driven by architecture and material properties. Recently, 3D printing of silicones has been used to create mechanical energy absorbing materials with negative stiffness, vascularized tissue constructs, stretchable sensors, soft robotics, and shape morphing materials. These advances are made possible by the flexible and stretchable nature of silicone elastomers, combined with the unique structural and compositional control enabled via 3D printing.

Additively manufactured siloxane materials allow tailored mechanical properties of porosity between printed filaments that may be defined as inter-filament (e.g., inter-strand, inter-ligament, etc.) porosity. Applications benefitting from structurally engineered porosity created by 3D printing include engineered tissue scaffolds, photolithographic patterned nanowire growth for tailored electronics, and nanolithography metamaterials with a negative refractive index for cloaking and superlensing applications, engineered with unit cells smaller than the wavelength of light.

Further spatial and temporal control can be achieved by 3D printing with shape memory polymers. Since their development, polymers with shape memory behavior have found applications in self-repairing components, high performance textiles, and surgical medicine. Recently, shape memory polymers with elastomeric behavior at elevated temperatures have shown promise with very large strain and energy storage capacities.

In the field of net-shape processing, it would be desirable to incorporate the enhanced tunability and functionality of shape memory behavior to 3D printed objects, thereby enabling controlled structural deformation to occur post-processing. Moreover, it would be desirable to imbue 3D printed objects with an additional dimension, such as time, wherein the 3D printed objects change their configuration in response to external stimuli.

Hierarchical porosity may be achieved by additive manufacturing methods, such as fused deposition modeling, using melt extruded thermoplastic materials combined with salt as a pore former to create structures with intra-strand variability in porosity. However, this process requires post processing soaking steps to leach out the salt through solvation methods in water to produce intra-strand porosity.

In some attempts to engineer graded porosity, direct ink write additive manufacturing processes have been limited by overhanging spanning structures where the distance between strands causes sagging and the print fails. Approaches to remedy these limitations have included support structures or media to provide a structure for the printed bead during the printing of overhanging structures. Thus, these approaches have a limiting maximum allowable distance between strands that essentially determines the porosity for the material. It has remained elusive how to form a self-standing structure having graded porosity using direct ink writing techniques.

SUMMARY

In accordance with one embodiment, a product includes a porous three-dimensional printed structure having printed filaments arranged in a geometric pattern. The printed filaments include a material having a plurality of gas-filled microballoons. The printed structure has hierarchical porosity including an inter-filament porosity defined by the arrangement of the printed filaments, and an intra-filament porosity of the material. The intra-filament porosity is defined by the plurality of gas-filled microballoons in the material of the printed filament.

In accordance with another embodiment, an ink system for printing a three-dimensional structure includes a first ink and a second ink. Each ink includes a matrix material and a filler, where the second ink includes a plurality of first unexpanded gas-filled microballoons.

In accordance with yet another embodiment, a method includes extruding a mixture through a nozzle to form a structure of extruded filaments arranged in a pre-defined arrangement. The mixture includes a first ink and a second ink with each of the inks having a matrix material and a filler. The second ink includes a plurality of unexpanded gas-filled microballoons. In addition, the method includes heating the extruded filaments of the formed structure under a negative pressure system for expanding the unexpanded gas-filled microballoons to achieve intra-filament porosity and curing the matrix material of the extruded filaments to at least a pre-defined extent. A ratio of the first ink to the second ink in the mixture extruded through the nozzle is pre-defined and/or controlled.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 4A is a plot of particle size distribution using transmitted light microscopy of $T_g44$ and $T_g113$ microballoons.

FIG. 4B is an optical microscopy image of $T_g44$ microballoons.

FIG. 4C is an optical microscopy image of $T_g113$ microballoons.

FIG. 4D is a schematic illustration of the 3D printing process, according to one approach.

FIG. 4E is an optical microscopy image of x-y view of the 3D printed filaments, according to one approach.

FIG. 4F is an optical microscopy image of x-z view of the 3D printed filaments, according to one approach.

FIG. 4G is a high magnification optical microscopy image of the x-z view (FIG. 4F) of a 3D printed filament, according to one approach.

FIG. 6A is a schematic drawing of a shape memory experiment.

FIG. 6B is a bar graph of shape memory recovery following thermal soak under compressive strain at 70° C. for 70 hours of 3D printed structures of matrix (neat resin), matrix+$T_g44$ microballoons (40 vol % $T_g44$), and matrix+$T_g113$ microballoons (40 vol % $T_g113$), according to various approaches.

FIG. 6C is a bar graph of shape memory recovery of a 3D printed structure of matrix+$T_g44$ microballoons at temperatures near $T_g$ and above $T_g$, according to various approaches.

FIG. 6D is an optical microscopy image of the initial state of a 3D printed structure of matrix+$T_g44$ microballoons, according to one approach.

FIG. 6E is an optical microscopy image of the compressed state of a 3D printed structure of matrix+$T_g44$ microballoons, according to one approach.

FIG. 6F is an optical microscopy image of the recovered state of a 3D printed structure of matrix+$T_g44$ microballoons, according to one approach.

FIG. 13A is a series of images of hexagonal closed paced (hcp) lattices printed with an ink comprising 5 wt. % unexpanded gas-filled microballoons, according to one embodiment. Part (a) is an image at low magnification, part (b) is an image at high magnification.

FIG. 13B is a series of images of hexagonal closed paced (hcp) lattices printed with an ink comprising 7 wt. % unexpanded gas-filled microballoons, according to one embodiment. Part (a) is an image at low magnification, part (b) is an image at high magnification.

DETAILED DESCRIPTION

Figure 1B:
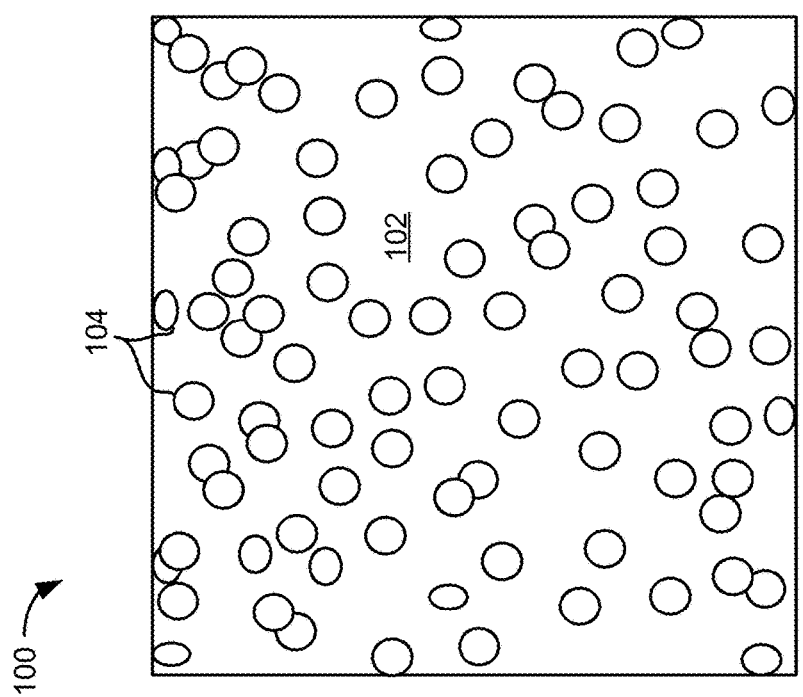
FIG. 1B is a schematic drawing of a three dimensional (3D) printed structure using ink of a matrix material filled with $T_g$-specific polymer microballoons, according to one embodiment.

The following description is made for the purpose of illustrating the general principles of the present invention and is not meant to limit the inventive aspects claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As also used herein, the term "about" denotes an interval of accuracy that ensures the technical effect of the feature in question. In various approaches, the term "about" when combined with a value, refers to plus and minus 10% of the reference value. For example, a thickness of about 10 nm refers to a thickness of 10 nm±1 nm, a temperature of about 50° C. refers to a temperature of 50° C.±5° C., etc.

It is also noted that, as used in the specification and the appended claims, wt. % is defined as the percentage of weight of a particular component is to the total weight/mass of the mixture. Vol. % is defined as the percentage of volume of a particular compound to the total volume of the mixture or compound. Mol. % is defined as the percentage of moles of a particular component to the total moles of the mixture or compound. Atomic % (at. %) is defined as a percentage of one type of atom relative to the total number of atoms of a compound.

Unless expressly defined otherwise herein, each component listed in a particular approach may be present in an effective amount. An effective amount of a component means that enough of the component is present to result in a discernable change in a target characteristic of the ink, printed structure, and/or final product in which the component is present, and preferably results in a change of the characteristic to within a desired range. One skilled in the art, now armed with the teachings herein, would be able to readily determine an effective amount of a particular component without having to resort to undue experimentation.

The present disclosure includes several descriptions of exemplary "inks" used in an additive manufacturing process to form the inventive aspects described herein. It should be understood that "inks" (and singular forms thereof) may be used interchangeably and refer to a composition of matter comprising a plurality of particles coated with/dispersed throughout a liquid phase such that the composition of matter may be "written," extruded, printed, or otherwise deposited to form a layer that substantially retains its as-deposited geometry and shape without excessive sagging, slumping, or other deformation, even when deposited onto other layers of ink, and/or when other layers of ink are deposited onto the layer. As such, skilled artisans will understand the presently described inks to exhibit appropriate rheological properties to allow the formation of monolithic structures via deposition of multiple layers of the ink (or in some cases multiple inks with different compositions) in sequence.

The following description discloses several preferred structures formed via direct ink writing (DIW), extrusion freeform fabrication, or other equivalent techniques and therefore exhibit unique structural and compositional characteristics conveyed via the precise control allowed by such techniques. The physical characteristics of a structure formed by DIW may include having lower layers of the structure that are slightly flattened, slightly disfigured from original extrusion (e.g., see slight droop of the filament in FIGS. 4E and 4F), etc. by weight of upper layers of structure, due to gravity, etc. The three-dimensional structure formed by DIW may have a single continuous filament that makes up at least two layers of the 3D structure.

In accordance with one general embodiment, a product includes a porous three-dimensional printed structure having printed filaments arranged in a geometric pattern. The printed filaments include a material having a plurality of gas-filled microballoons. The printed structure has hierarchical porosity including an inter-filament porosity defined by the arrangement of the printed filaments, and an intra-filament porosity of the material. The intra-filament porosity is defined by the plurality of gas-filled microballoons in the material of the printed filament.

In accordance with another general embodiment, an ink system for printing a three-dimensional structure includes a first ink and a second ink. Each ink includes a matrix material and a filler, where the second ink includes a plurality of first unexpanded gas-filled microballoons.

In accordance with yet another general embodiment, a method includes extruding a mixture through a nozzle to form a structure of extruded filaments arranged in a pre-defined arrangement. The mixture includes a first ink and a second ink with each of the inks having a matrix material and a filler. The second ink includes a plurality of unexpanded gas-filled microballoons. In addition, the method includes heating the extruded filaments of the formed structure under a negative pressure system for expanding the unexpanded gas-filled microballoons to achieve intra-filament porosity and curing the matrix material of the extruded filaments to at least a pre-defined extent. A ratio of the first ink to the second ink in the mixture extruded through the nozzle is pre-defined and/or controlled.

The inventive aspects described herein provide an improvement to stochastic elastomeric structures with property-specific tailoring of three-dimensional printed polymer structures having hierarchical porosity and shape memory.

A list of acronyms used in the description is provided below.

3D Three dimensional
ASTM American Society for Testing and Materials
DIW Direct ink writing
C Celsius
cm centimeter
FCT Face-centered tetragonal
FDM Fused deposition modeling
g grams
mg milligrams
ml milliliters
mm millimeter
$T_g$ Glass transition temperature
μm micron, micrometer
SMP Shape memory polymer Hierarchical porosity, e.g., structural porosity and intrastrand porosity, allows lightweighting and tailoring mechanical response and introduces functionality into 3D printed silicones. Various inventive aspects described herein achieve hierarchical porosity by combining printed structural porosity (i.e., inter-strand porosity) with intra-strand porosity by adding hollow, gas-filled microballoons to the ink used in the 3D printing.

In some approaches, additively manufactured elastomeric foams with intra-strand porosity have been demonstrated to exhibit on demand shape memory properties by stimuli induced expansion. In initial approaches, as described herein, the porosity of printed foams may be increased through tailoring inter-strand porosity (e.g., structural engineering of printed filaments), however a methodology for engineering a tunable increase in intra-strand porosity and tailoring intra-strand porosity remained elusive. Recent approaches describe a methodology to fabricate additively manufactured foams with predictable and tailored intra-strand porosity allowing for significantly higher porosity, variable intra-strand porosity, and added structural complexity that may be varied in real time throughout the direct ink writing printing process through post processing methods of microballoons post manufacturing, prior to carrier siloxane resin cure.

Unlike conventional shape memory polymers (SMP), inventive aspects described herein form porous elastomeric structures with shape memory behavior. Conventional SMP are programmed about an optimal glass transition temperature ($T_g$) such that the SMP is heated above the $T_g$, programmed (e.g., folded, compressed, manipulated), then cooled to final shape.

As generally understood by one skilled in the art, the glass transition temperature of a material is a temperature, or range of temperatures, at which an amorphous material transitions from a hard, relatively brittle glassy state into a viscous or rubbery state as the temperature is increased. In some approaches, the glass transition temperature may be associated with amorphous regions within semi-crystalline material and as the temperature increases, these amorphous regions transition from a hard glassy state to a viscous material. Moreover, the glass transition temperature of a material tends to be lower than the melting temperature of the crystalline state of the material.

Crystallinity may be used as a fixing state in SMPs resulting in the materials of the SMPs being rigid. Moreover, in some cases, the final form of the SMP is a glassy state, e.g., a rigid, brittle glass. The mechanical properties of SMPs in a rigid, crystalline state or a glassy state are limited.

It would be desirable to impart a shape memory change such that the materials are elastomeric while in the secondary shape.

Various inventive aspects described herein introduce $T_g$-specific polymer microballoons in which the component imparting the shape memory, e.g., the shell of the microballoon, may be a minority component of the composite but may affect the material properties of the composite structure in a significant and desired way. The different temperature specifications of the elastomeric matrix and the $T_g$-specific microballoons thereby may allow, at targeted temperatures, shape memory characteristics in an elastomeric material.

In various inventive aspects, elastomers may be embedded with gas-filled, polymer shell microballoons with low glass $T_g$ to form composites with shape memory behavior. When compressed, folded, or otherwise manipulated during thermal soak at temperatures near or above the $T_g$ of the microballoon, the composite may undergo deformation and experience compression set. Full shape recovery of the deformed composite may be achieved by re-heating the composite without mechanical loading or constraint above the $T_g$ of the microballoon for a set time required for the microballoons to expand (due to gas expansion upon heating). Full shape recovery can be achieved in this way.

Various inventive aspects described herein show that aside from their role in tuning the mechanical behavior of 3D printed architectures, $T_g$-specific polymer microballoons may be good candidates for shape memory applications in porous materials requiring structural complexity with the ability to achieve open and/or closed cell porosity.

Various inventive aspects described herein demonstrate that shape memory may be achieved in 3D printed porous elastomers simply by the addition of polymer microballoons with particularly selected shell glass transition temperatures.

Figure 1C:
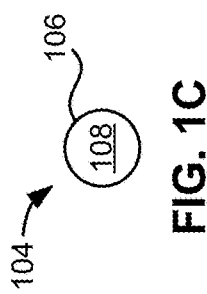
FIG. 1C is a schematic drawing of the cross-section of a $T_g$-specific polymer microballoon, according to one embodiment.
Figure 1A:
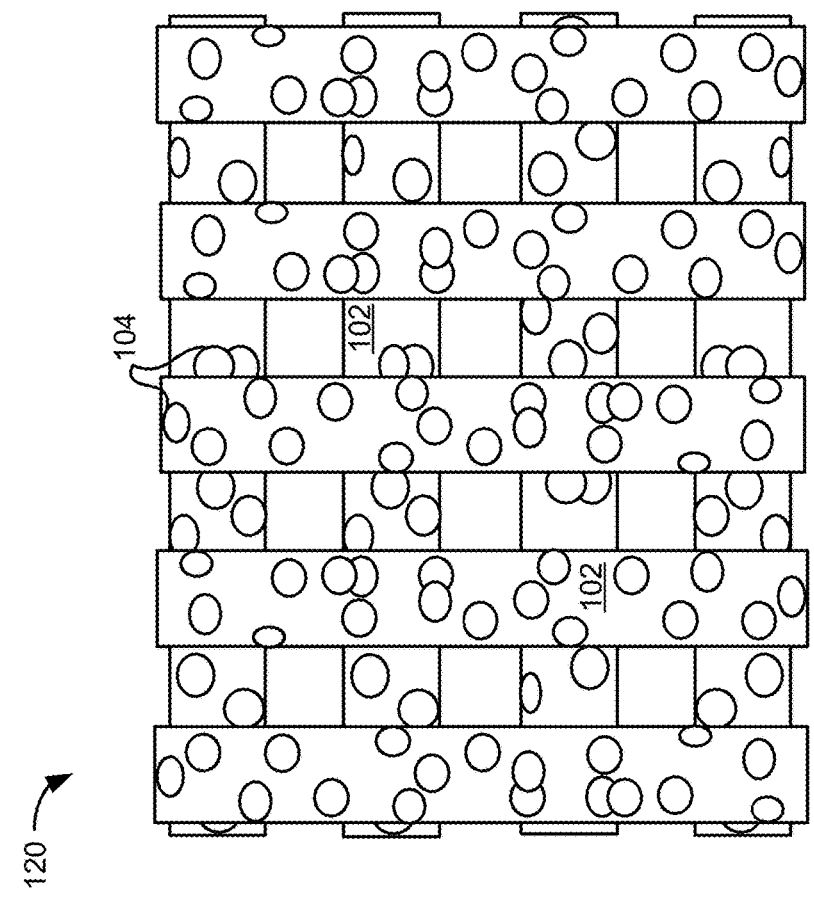
FIG. 1A is a schematic drawing of a cast matrix material filled with $T_g$-specific polymer microballoons, according to one embodiment.

FIGS. 1A-1B depict products 100 and 120 of elastomeric matrix with polymer microballoons, in accordance with various embodiments. As an option, the present products 100 and 120 may be implemented in conjunction with features from any other embodiment listed herein, such as those described with reference to the other FIGS. Of course, however, products 100 and 120 and others presented herein may be used in various applications and/or in permutations which may or may not be specifically described in the illustrative embodiments listed herein. Further, the products 100 and 120 presented herein may be used in any desired environment.

In one inventive aspect, a product may include a porous three-dimensional (3D) printed polymer structure having elastomeric shape memory. The structure may include a material having a plurality of gas-filled microballoons. In some approaches, the plurality of gas-filled microballoons may be a plurality of gas-filled polymer microballoons. Moreover, in some approaches, the structure may have hierarchical porosity. A structure having hierarchical porosity is defined as a structure having porosity across multiple length scales.

FIG. 1A is a schematic drawing of a product 100 of an elastomeric matrix material 102 that contains $T_g$-specific polymer microballoons 104. In one approach, as shown in FIG. 1A, a product 100 of elastomeric matrix material 102 with polymer microballoons may be cast (e.g., molded, formed, etc.) into a bulk structure (e.g., monolith, mold, etc.).

In another approach, as shown in FIG. 1B, a product 120 of elastomeric matrix material 102 with polymer microballoons 104 may be printed into a 3D structure by various techniques.

In one approach, a closed cell composite, e.g., shown as a product 100, may have mechanical properties that are defined by the matrix material 102, which is the majority component of the composite, with porosity provided by flexible, thin-walled $T_g$-specific polymer microballoons 104 mixed within the matrix material 102. The matrix material 102 may be an elastomeric material that provides dampening and cushioning but typically may not provide shape memory.

In various inventive aspects, the thin-walled $T_g$-specific polymer microballoons 104 may provide a shape retention component of the structure, for example, a structure printed with an elastomer matrix filled with thin-walled $T_g$-specific polymer microballoons allow imposition of shape memory behavior to an elastomer matrix.

In another approach, an open cell composite structure formed by 3D printing (as shown in product 120, FIG. 1B) may have elastomeric matrix material 102 that provides structural porosity, and the flexible, thin-walled $T_g$-specific polymer microballoons 104 provide intrastrand porosity as well as shape change memory. In other approaches, an open cell composite structure may be formed as a mold or cast by foam-forming processes in which open pores are imparted in the matrix material. As described with the closed cell composite above, the matrix material 102 may be an elastomeric material that provides dampening and cushioning but typically may not, by itself, provide shape memory. In various inventive aspects, the thin-walled $T_g$-specific polymer microballoons may provide a shape retention component of the structure, for example, a structure printed with an elastomer matrix filled with thin-walled $T_g$-specific polymer microballoons allow application of shape memory to an elastomer matrix.

In one approach, the matrix material 102 may be an energy dissipating material. In another approach, the matrix material 102 may also and/or alternatively be an elastomer material. Illustrative matrix materials 102 include rubbery polymers, siloxane, polysiloxane, polyolefins (e.g., ethylene-propylene, isobutylene, isoprene, chloroprene . . . rubbers), polyurethanes, fluorinated olefins, polyethers, and their copolymers; acrylics (poly-n-butyl acrylate, poly-ethyl acrylate, their copolymers), etc. In an exemplary approach, the matrix material 102 is a siloxane resin.

FIG. 1C shows a schematic drawing of the cross-sectional view of a $T_g$-specific polymer microballoon 104, according to one approach. The polymer microballoon may be referred to as microsphere, microbead, etc., as the shape of the microballoon may be spherical, but other shapes are also contemplated. In some approaches, the polymer microballoon may be an expandable microscopic sphere. In one approach, the polymer microballoon has a thermoplastic shell 106 that encapsulates a filling 108 that may include a gas with a low boiling point, e.g., isobutane. In various approaches, the shell 106 of the microballoon may be formed from copolymer material.

Flexible, polymer microballoons with a desired $T_g$ may be obtained commercially or synthesized using methods known by those skilled in the art, e.g., emulsification techniques, micro-fluidic techniques, etc. In exemplary approaches, flexible, $T_g$-specific polymer microballoons mixed in with an elastomeric matrix allow shape change when heated above the $T_g$ of the microballoons and retain the shape change at cooler temperatures. Without wishing to be bound by any theory, it is believed that the $T_g$-specific polymer microballoons are capable of counteracting the elastic force of the elastomeric matrix when certain conditions are met, such as application of heat to the microballoons, thereby resulting in a shape change memory of the typically elastomeric, porous matrix structure.

Polymer microballoons having any possible $T_g$ may be used in various embodiments. The particular $T_g$ may be selected based on the desired application.

In some approaches, the shell 106 may be a structured copolymer material that contributes to a $T_g$ of the polymer microballoon where the $T_g$ of the polymer microballoon is between a lower temperature that allows deformation of the structure containing the polymer microballoons and a higher temperature that allows recovery of the original shape of the structure containing the polymer microballoons. In an exemplary approach, the $T_g$ of the polymer microballoon may be between about 40° C. and about 60° C. In one specific example, the $T_g$ of the polymer microballoon may be preferably about 44° C., referred to herein as $T_g44$.

The co-polymer microballoons may have any desired diameter. In some approaches, the size of the co-polymer microballoons may have a diameter in a range of about 20 μm to about 100 μm, preferably 30 μm to about 50 μm. In some approaches, an upper limit may be determined by the structural dimensions of the polymer composite. In exemplary approaches, microballoons may be 5:1 or preferably, 10:1 the smallest length of the part for continuum-like behavior. Upper limits may be limited by localized effects that may dominate in the polymer composite with larger microballoons.

In some approaches, the volume % (vol %) concentration of microballoons in the matrix material may be in the range of from about 5 vol % to a maximum packing of the microballoons in the matrix material, where the maximum vol % of microballoons may vary depending on the type of matrix material and the type and size of microballoons. In an exemplary approach to enable shape change memory, the vol % of microballoons may be in the range of about 20 vol % to about 50 vol % of microballoons in the matrix material.

As various inventive aspects describe herein, the porous 3D printed polymer structure may have at least 97% shape memory behavior compared to an original shape of the structure. The shape memory behavior may be defined as follows: compression of the structure, followed by heating near or above $T_g$, results in up to about 60% reduction in original thickness of the structure after cooling and removal of physical constraints; subsequent heating of this compressed structure above $T_g$ results in at least 97% recovery of original thickness.

In some approaches, the porous 3D printed polymer structure following recovery from compression may have at least 97% structure porosity compared to the porosity of the structure before compression.

Figure 2:
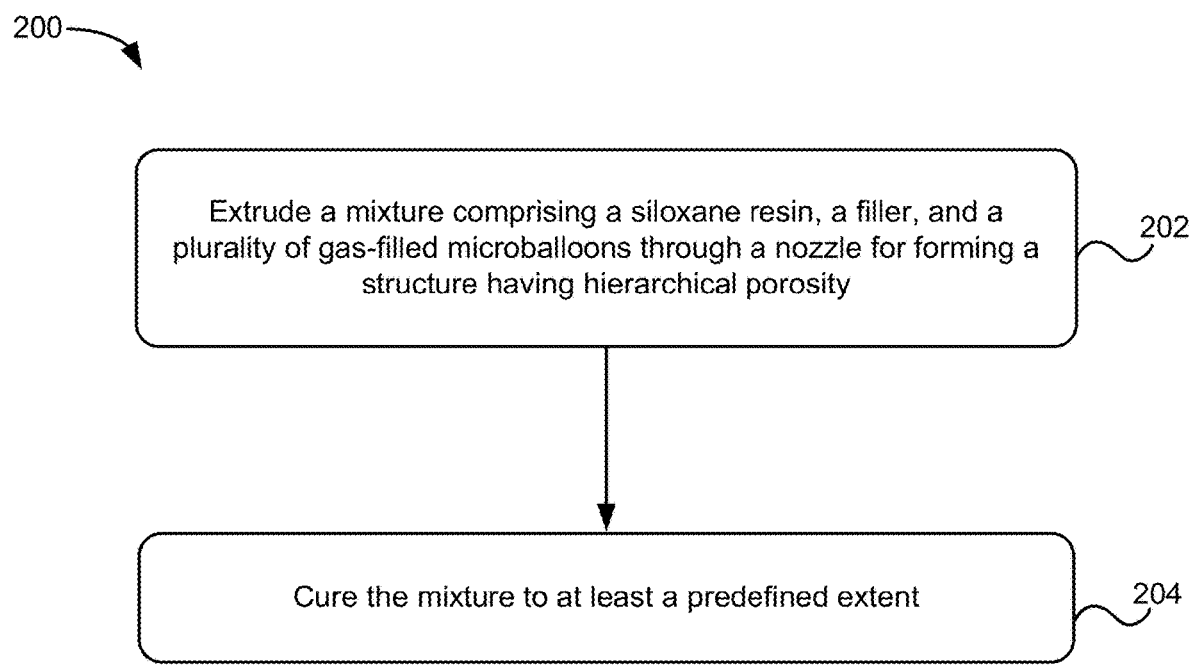
FIG. 2 is a flowchart of a method, according to inventive aspects described herein.

FIG. 2 shows a method 200 for forming a porous three-dimensional printed polymer structure having elastomeric shape memory in accordance with one embodiment. As an option, the present method 200 may be implemented to form structures such as those shown in the other FIGS. described herein. Of course, however, this method 200 and others presented herein may be used to form structures for a wide variety of devices and/or purposes which may or may not be related to the illustrative embodiments listed herein. Further, the methods presented herein may be carried out in any desired environment. Moreover, more or less operations than those shown in FIG. 2 may be included in method 200, according to various embodiments. It should also be noted that any of the aforementioned features may be used in any of the embodiments described in accordance with the various methods.

In one approach, method 200 begins with operation 202 of extruding a mixture that includes a matrix material, a filler, and a plurality of gas-filled microballoons through a nozzle for forming a structure having hierarchical porosity. In some approaches, the mixture may be an ink for additive manufacturing. In some approaches, the mixture may be an ink for three-dimensional (3D) printing. In some approaches, the mixture may be an ink for direct ink writing. In preferred approaches, the mixture may be a siloxane-based ink for direct ink writing.

In some approaches, the concentration of the plurality of gas-filled microballoons may be in a range of about 20 volume % to about 60 volume % of total volume of ink. In some approaches, the plurality of gas-filled microballoons may include isobutane.

In some approaches, the filler of the microballoons may have a glass or crystalline transition in the temperature range of about room temperature (e.g., between about 20° C. and 25° C.) to about 200° C. In some approaches, the plurality of gas-filled microballoons may include a shell having copolymer material. In other approaches, the plurality of gas-filled microballoons may include a shell having polymer material. Illustrative examples of shell material include polymethylmethacrylate, polystryrene, polystyrenedivinylbenzene copolymer, polycarbonate, polyacetal, polyethyleneterephthalate, polyethylenenaphthalate, etc. In one approach, the plurality of gas-filled microballoons may include a shell having phenol formaldehyde resin. In preferred approaches, the shell of the gas filled microballoons may include poly(vinylidene chloride-co-acrylonitrile-co-methyl methacrylate (e.g., as included in Expancel).

In some approaches, the gas-filled microballoons may have a glass transition temperature in a range of about room temperature (e.g., between about 20° C. and 25° C.) to about 200° C. The transition temperature in the microballoon shell allows the material comprised of the microballoons to take on a temporary shape at temperatures below the transition temperature. Then, at temperatures above the transition temperature, the material comprised of the microballoons may recover to a primary or equilibrium shape. The transition may be a glass transition, a crystalline transition, etc.

In some approaches, the gas-filled microballoons may have a glass transition temperature of less than 60° C. In preferred approaches, the gas-filled microballoons may have a glass transition temperature less than 50° C. In an exemplary approach, the gas-filled balloons have a glass transition temperature of 44° C.

In some approaches, the gas-filled microballoons may have a glass transition temperature less than 115° C. In one approach, the gas-filled balloons have a glass transition temperature of 113° C.

In various approaches, the matrix material 102 may be an energy dissipating material. In another approach, the matrix material 102 may also and/or alternatively be elastomer material. Illustrative matrix materials 102 include rubbery polymers, siloxane, polysiloxane, polyolefins (e.g., ethylene-propylene, isobutylene, isoprene, chloroprene . . . rubbers), polyurethanes, fluorinated olefins, polyethers, and their copolymers; acrylics (poly-n-butyl acrylate, poly-ethyl acrylate, their copolymers), etc. In an exemplary approach, the matrix material may be a siloxane resin, preferably, a polydimethylsiloxane resin.

In some approaches, the filler in the mixture may be a nanosilica filler.

In some approaches, the mixture of the ink may include a curing agent. For example, the curing agent may be a heat-cure additive that induces polymerization of the mixture of the structure during application of heat. In other approaches, the curing agent may be an additive that may be activated by ultraviolet radiation.

In some approaches, the mixture (e.g., ink) may contain an effective amount of one or more additional additives that may perform specific functions. For example, but not limited to, the additives may enhance dispersion, phase stability, and/or network strength; control and/or change pH; modify rheology; reduce crack formation during drying; enhance curing; etc. The effective amount of an additive is an amount that imparts the desired function or result and may be readily determined without undue experimentation following the teachings herein and varying the concentration of the additive, as would become apparent to one skilled in the art upon reading the present description.

A 3D printing approach to form the elastomeric composite with $T_g$-specific polymer microballoons enables property-specific tailoring, resulting in mechanical metamaterials that may be tuned with constituent material behavior, porosity and structure. Examples of 3D printed metamaterials may be found in ceramic and metallic hierarchical lattice structures with mechanical behavior outside that of conventionally processed materials achieved through tuning levels of hierarchy, porosity and material constituents.

In a 3D printing process, viscoelastic inks with highly controlled rheological behavior may be extruded through a microscale nozzle or die, thereby resulting in the layer-by-layer building of programmable architectures whose complexity may be controlled by strand size and spanning distance over gaps in the underlying layers. Strand size may be influenced by the applied pressure, die geometry, and rheological response of the resin. Spanning distance over gaps in the underlying layers may be a function of gel strength, deposition speed, shear rate, and resin density. Various embodiments described herein form intrastrand porosity using an elastomeric based ink comprised of $T_g$-specific polymer microballoons to further enhance the compressibility of porous elastomeric structures.

In various approaches, 3D structures may be formed by additive manufacturing techniques, for example, but not limited to, stereolithography-based methods, powder bed binder printing, selective laser sintering, ink-jet printing, direct ink writing, etc.

One 3D printing process, using a direct ink writing (DIW) process, illustrated in FIG. 4D, highlights the potential of $T_g$-specific polymer microballoons to substantially reduce the printed strand density, which may lead to enhanced strand spanning capability. In various approaches, DIW using ink comprised of elastomeric matrix with $T_g$-specific gas-filled polymer microballoons may form structures in any conceivable formation, such as cross-pike formation, log-pile formation in which each stack is orthogonal to the stack underneath (see FIG. 1B), a stacked formation in which each layer is at an angle (e.g., 45°, 60°, 90°, etc.) from the layer below, rotating stacks forming a helical-type structure, spiral formation, etc. Moreover, the microarchitecture of structures formed by 3D printing may introduce porosity in a specific mode, e.g., open cell porosity, closed cell porosity, volume filling, etc. In some approaches, the macrostructure formed by 3D printing with the ink including elastomeric matrix with $T_g$-specific gas-filled microballoons may have hierarchical porosity.

In one approach of solid-based additive manufacturing (e.g., fused deposition modeling (FDM)), a shape of a 3D volume may include stacking filaments as directed by a computer. Following this method, elastomers may be printed in 3D at a temperature range below the operation of the $T_g$-specific gas-filled microballoons. For example, for 3D printing by FDM, a thermoplastic elastomeric material with a melting temperature range that is below the temperature range of the $T_g$-specific polymer microballoons may successfully preserve microballoon structure during printing.

$T_g$-specific polymer microballoons may provide a means of tuning the mechanical performance of 3D printed elastomers, beyond architecture; the lattice is limited by nozzle diameter, ink rheology and available extrusion pressure.

In one approach of method 200, as shown in FIG. 2, after forming the structure, operation 204 includes curing the mixture formed into the structure to at least a predefined extent, which may include partial curing or full curing. Preferably, the material in the structure is cured enough to enable the structure to retain its freestanding physical form factor upon completion of the curing cycle. In some approaches, curing includes a purge with inert gas at a first temperature and heating at a second temperature, and the first and second temperatures may be different. In some approaches, the predefined extent of curing is the extent that the structure has the desired form, and stability according to a predefined specification. The predefined extent may be readily determined without undue experimentation following the teachings herein and varying the concentration of the curing agent and/or conditions of curing (e.g., heat, ultraviolet radiation, etc.), as would be apparent to one skilled in the art upon reading the present description.

3D printed elastomeric structures filled with $T_g$-specific polymer microballoons may demonstrate shape memory behavior. The shell thickness of the microballoons and $T_g$ of the microballoons may affect compressive behavior and compression set of 3D printed structures formed with matrix material filled with $T_g$-specific polymer microballoons. In some approaches, a matrix filled with $T_g$-specific polymer microballoons may introduce another level of porosity in 3D-printed strands of the structures and thereby alter the mechanical response that may be dependent on the shell thickness and mechanical behavior of the $T_g$-specific polymer microballoons.

In one approach, a 3D structure formed with matrix infused with $T_g$44 microballoons may undergo compression set at short holds at temperatures above $T_g$ (e.g., 70° C. to 110° C.). While substantial shape recovery of the compressed structure may be observed at lower temperature reheats, complete structural recovery may occur upon reheating at elevated temperature (110° C.). Without wishing to be bound by any theory, the shape recovery may be attributed to re-expansion of the microballoons when heated above $T_g$ and with shape retention accommodated by the cross-linked structure.

In other approaches, a reduced compression set may be observed in a higher $T_g$ system (e.g., $T_g$113 microballoons) with a lack of recovery of shape upon reheating. In some approaches, the structural response may be tuned using a hierarchical combination of open and closed cell porosity, in conjunction with the addition of variable $T_g$-specific polymer microballoon populations.

The shape memory behavior exhibited by the $T_g$44 microballoon-filled 3D printed structures may demonstrate a potential use in wearable protective padding and cushions with $T_g$ optimized for human body temperature (e.g., 95-101° F.), in shape memory polymer matrices toward the development of tandem shape memory polymers capable of recovery in stages depending on the temperature.

In one approach, flexible, co-polymer microballoons may be used in conjunction with conventional foam manufacturing techniques, for example, gas-blown polymer foam techniques (e.g., using blowing agents), continuous direct foam forming techniques (e.g., using a poreformer), etc. The flexible, low $T_g$-specific polymer microballoon material may impart a shape memory effect in the foam formation.

In some approaches, foams may be formed with two or more different types of porosities. In one approach, pores may be introduced using the low $T_g$-specific polymer microballoons. In another approach, or the same approach, pores may be introduced by the foam formation, e.g., by gas-blown techniques, of expanding the matrix material and creating pores. In one gas-blown foam formation approach, porosity may be closed cell in which discrete cells (e.g., microballoons) are dispersed in the matrix. In another gas-blown foam formation approach, porosity may be open cell in which pathways are formed through the matrix structure such that the pathways percolate, e.g., as to allow gas to flow in and out of the foam structure.

In some approaches, foams formed with elastomeric matrix material and low $T_g$-specific polymer microballoons may have tunable mechanical behavior in terms of tension, compression, expansion coefficient, etc.

In some approaches, a 3D printed structure may be tuned with different variable $T_g$-specific polymer microballoon populations in the elastomeric matrix. In some approaches, during the printing process, the structure may have different compositions of a microballoon. In one approach, microballoons of the same type may be discrete and esoterically placed in a three-dimensional (3D) volume. In another approach, the microballoons may be placed to amplify the shape memory effect and randomly distributed throughout the volume. In yet another approach, a single layer of a 3D printed structure may have a microballoon of one type in a concentration gradient across the layer.

In some approaches, printing may be performed using a displacement controlled 3-axis 3D printing platform, resulting in cross-ply structures 306 with each subsequent layer fashioned at a 90° angle from the one prior. FIG. 4D is a simple schematic illustration that illustrates a 3-axis 3D printing platform 301 with a 3D printing apparatus 302. The formed structure 306 may be a face-centered tetragonal (FCT) 3D structure. As shown in FIG. 4D, a 250 µm nozzle 304 may be used to produce prints, for example but not meant to be limiting in any way, prints may be produced at a size of a 50×50 mm square at 8 layers thick, as indicated by the scale bar of 1 cm in FIG. 4D.

In some approaches, the structure having a FCT structure may be compressed to structural lock up in which the struts of the of the structure in contact with neighboring struts dominate the compression of the structure. In some approaches, the compression state of the structure may be due to the material of the structure. In one approach, the structural based response to compression may become a material based response to compression. For example, a porous material under compression may become a material without porosity.

FIGS. 4E-4G are optical images of printed silicones with microballoons showing the x-y view (FIG. 4E), the x-z view (FIG. 4F), and a high magnification of the image shown in FIG. 4F showing microballoons in a printed filament (FIG. 4G).

In some approaches, a 3D printed structure may be tuned to have compositions of different types of microballoon populations in the elastomeric matrix. In one approach, microballoons of different types may be discrete and esoterically placed in a three-dimensional volume. In another approach, the microballoons of different types may be placed to amplify the shape memory effect and randomly distributed throughout the volume. In yet another approach, 3D printing of the structure may involve targeted placement of microballoons of different types.

In some approaches, a 3D-printed structure may be tuned to have different microballoons in different layers of the structure. In one approach, for example, a single layer may contain microballoons of one type, the next layer contain microballoons of a different type, and the following layer contain microballoons of yet another type of microballoons or the same type as the first and/or second layer.

In some approaches, gradients of microballoon types and/or concentrations may be formed within a 3D structure, e.g., by selectively controlling the composition of the ink during printing. In one approach, a single layer may have microballoons of two different types in a concentration gradient. In another approach, each layer may have a defined concentration gradient of a microballoon of one type where the gradient may be different within each layer. In yet another approach, a gradient of the microballoons in each layer may result in an expansion effect in the 3D printed structure.

Microballoon-Mediated Tuning of Intra-Strand Porosity

According to various approaches described herein, structures formed with expanded gas-filled microballoons may have an intra-strand (e.g., intra-filament) porosity of approximately 20 to 60 vol. % of the total structure. However, the maximum pore cell size of the intra-strand pores may be defined by the nozzle orifice diameter, for example, a limited number of expanded gas-filled microballoons may pass through the nozzle at any one time. It is desirable, therefore, to increase intra-strand porosity, and lower overall porosity of a structure using siloxane-based inks having gas-filled microballoons. Moreover, it is desirable to be able to engineer predictable architectural complexity, including intra-filament volume expansion, for example, a sinusoidal architecture of the printed filaments while maintaining an overall final diameter of the printed bead.

Figure 8:
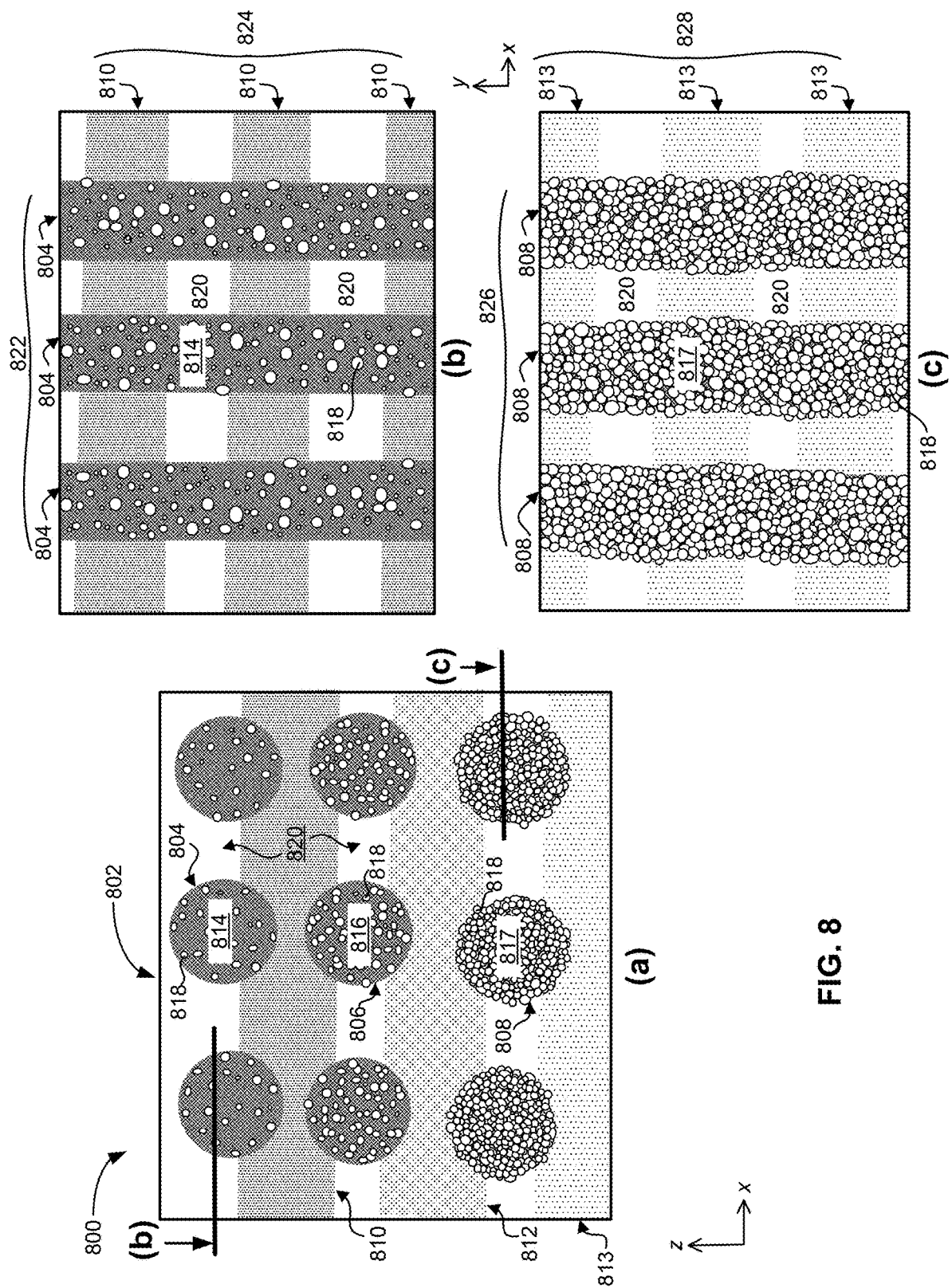
FIG. 8 is a schematic drawing of a product having a gradient of porosity, according to one embodiment. Part (a) is a side-view of a log-pile structure of printed filament having graded porosity, part (b) is a top-down view of the uppermost layer of the log-pile structure, and part (c) is a top-down view of a lower layer of the log-pile structure.

FIG. 8 depicts a product 800 of porous three-dimensional (3D) printed structure having a plurality of gas-filled microballoons, in accordance with various embodiments. As an option, the present product 800 may be implemented in conjunction with features from any other embodiment listed herein, such as those described with reference to the other FIGS. Of course, however, the product 800 and others presented herein may be used in various applications and/or in permutations which may or may not be specifically described in the illustrative embodiments listed herein. Further, the product 800 presented herein may be used in any desired environment.

As shown in the side view depicted in part (a) of FIG. 8, according to one embodiment, a product 800 include a porous 3D printed structure 802 having printed filaments 804, 806, 808, 810, 812 arranged in a geometric pattern. The printed filaments 804, 806 comprising a material 814, 816 having a plurality of gas-filled balloons 818. The printed structure 802 may have a hierarchical porosity that includes inter-filament porosity defined by the arrangement of the printed filaments 804, 806, 808, 810, 812. The inter-filament porosity includes inter-filament pores 820 that have a shape defined by the arrangement of the adjacent printed filaments 804, 806, 810. An intra-filament porosity of the material 814, 816 is defined by the plurality of gas-filled microballoons 818 in the material 814, 816 of the printed filament, 804, 806, respectively.

In some approaches, the printed structure 802 may have a pre-defined gradient of porosity resulting from the arrangement of the printed filaments 804, 806, 810, 812. For example, in one approach, inter-filament pores formed by the arrangement of a first layer of printed filaments may have a different width relative to pores formed by a second layer of printed filaments. In one approach, at least some of the printed filaments 804, 806, 808 may have a pre-defined gradient of intra-filament porosity. The gradient of porosity may be pre-defined according to a specification or design of the product.

As shown in part (a), the printed filaments 804 include a material 814 having a lower concentration of gas-filled microballoons thereby resulting in a lower porosity, and the printed filaments 806 include a material 816 having a higher concentration of gas-filled microballoons 818 thereby resulting in a higher porosity, and the printed filaments 808 have an even higher concentration of gas-filled microballoons 818 thereby resulting in even higher porosity. The structure 802 may have a gradient of intra-filament porosity.

A layer of the structure may have a plurality of printed filaments having a lower intra-filament porosity. Part (b) of FIG. 8 depicts a cross section of the printed structure 802 at (b) of part (a) along the x-axis. In one layer 822, each of the printed filaments 804 include a material 814 having a lower concentration of gas-filled microballoons 818 resulting in a lower intra-porosity of the printed filament 804. The layer 822 of printed filaments 804 may be positioned above a layer 824 of printed filaments 810 arranged in a direction orthogonal to the direction of the printed filaments 804 having lower intra-porosity. The arrangement of the printed filaments 804, 810 of each layer 822, 824 form inter-filament pores 820.

A layer of the structure may have a plurality of printed filaments having a higher intra-filament porosity. Part (c) of FIG. 8 depicts a cross section of the printed structure 802 at (c) of part (a) along the x-axis. In one layer 826, each of the printed filaments 808 include a material 817 having a higher concentration of gas-filled microballoons 818 resulting in a higher intra-porosity of the printed filament 808. The layer 826 of printed filaments 808 may be positioned above a layer 828 of printed filaments 813 arranged in a direction orthogonal to the direction of the printed filaments 808. The intra-filament porosity of the printed filaments 813 of layer 828 may be the same or different than the intra-filament porosity of the printed filaments 808 of layer 826. The arrangement of the printed filaments 808, 813 of each layer 826, 828 form inter-filament pores 820.

According to one embodiment, the system may enable on-demand variability of porosity of three-dimensional (3D) prints, such as a 3D structure having graded porosity. In various approaches, a graded porosity may include at least one of the following: a gradient of low density ink (LDI) to high density ink (HDI), a gradient of low porosity ink (LPI) to high porosity ink (HPI), etc. In addition, various approaches may include a polymeric base curing process using thermal, microwave, acoustic, photo-based, etc. techniques to produce graded compositions of materials within a printed part. Moreover, various approaches enable tuning the system to induce intra-strand volumetric expansion.

According to one embodiment, the printed filaments of the structure may have an intra-filament porosity in a range of greater than 0 vol. % to about 98 vol. % relative to the total volume of the material. The intra-filament porosity may be tuned relative to the amount of microballoons added to the ink system.

In preferred approaches, the printed structure has elastomeric shape memory behavior. For example, the printed structure has the ability to return from a deformed state (e.g., temporary compressed state) to its original (e.g., permanent state) when induced by an external stimulus, force, etc. In one approach, the printed structure, following recovery from compression, may have at least 97% structure porosity compared to a porosity of the structure before compression. Structure porosity may be defined in terms of the of inter- and intra-filament porosity of the formed structure as described herein.

In one approach, the printed structure includes pre-defined zones of porosity, where a first zone of porosity has at least 97% elastomeric shape memory behavior compared to an original shape of the structure, and a second zone of porosity has a different elastomeric shape memory behavior than the first zone of porosity. For example, a printed structure may be used as a sole of a shoe, where the heel portion of the sole is a zone of higher porosity compared to the toe box portion of the sole having a zone of lower porosity than the zone of higher porosity being the heel portion of the sole.

In one aspect of an embodiment, the material of a printed filament may include a compositional gradient of the plurality of gas-filled microballoons having a first glass transition temperature. The gradient of porosity may extend long the length of the printed filament in the direction of extrusion. In various approaches, by varying the concentration of microballoons within the structure, different degrees of shape memory may be imparted in different areas resulting in a "graded" shape memory.

Figure 9:
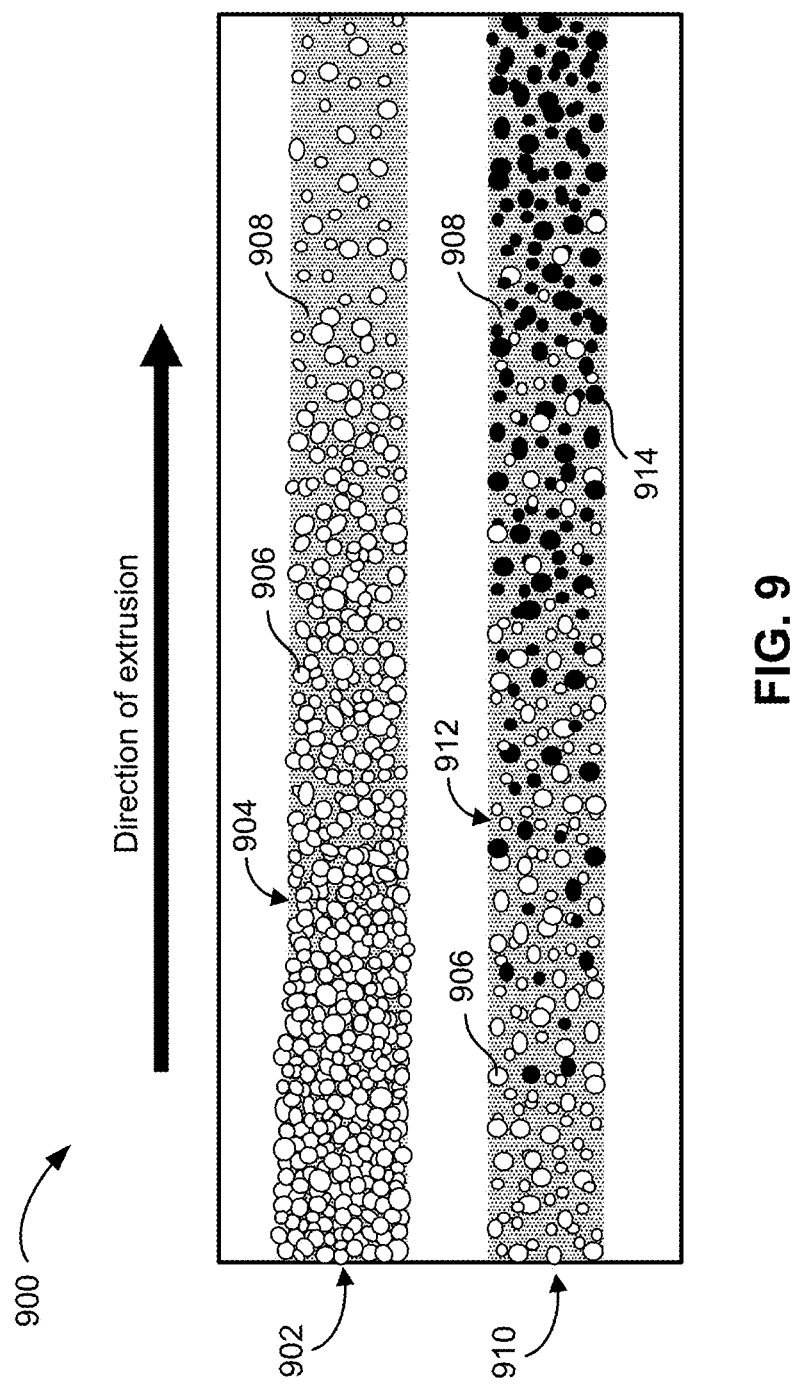
FIG. 9 is a schematic drawing of printed filaments having a gradient of intra-filament porosity and/or a compositional gradient, according to some approaches.

As shown in FIG. 9, a printed structure 900 may have printed filaments 902, 910 having a compositional gradient of gas-filled microballoons 906, 914. In one approach, a printed filament 902 includes a material 904 having a compositional gradient starting with a higher concentration of gas-filled microballoons 906 to a lower concentration of gas-filled microballoons 906 in the matrix material 908 in the direction of extrusion of the printed filament 902, such that the gradient of intra-filament porosity is from high porosity to low porosity. Alternatively, in some approaches, the gradient of porosity may be defined starting with a lower concentration of gas-filled microballoons to a higher concentration of gas-filled microballoons, such that the gradient of porosity is from a low porosity to a high porosity within the printed filament in the direction of extrusion. In one approach, a low intra-filament porosity region of the printed filament may be essentially free of gas-filled microballoons, and the printed filament includes increasing amount of gas-filled microballoons in the direction of extrusion to achieve a compositional gradient of gas-filled microballoons resulting in a gradient of intra-filament porosity within the single printed filament.

In another approach, a printed filament includes a material having a plurality of gas-filled microballoons having a second glass transition temperature, where the first glass transition temperature is different than the second glass transition temperature. As illustrated in FIG. 9, a printed filament 910 may include a material 912 having a matrix material 908 and a combination of different types of gas-filled microballoons 906, 914, where each type of gas-filled microballoon has a different glass-transition temperature. In one approach, the compositional gradient of the gas-filled microballoons 906 having a first glass transition temperature is relative to a composition of the gas filled microballoons 914 having the second glass transition temperature. In one approach, a printed structure may include printed filaments having one type of gas-filled microballoons forming a gradient of intra-filament porosity and printed filaments having a compositional gradient of a first type of gas-filled microballoons relative to a second type of gas-filled microballoons.

Figure 10A:
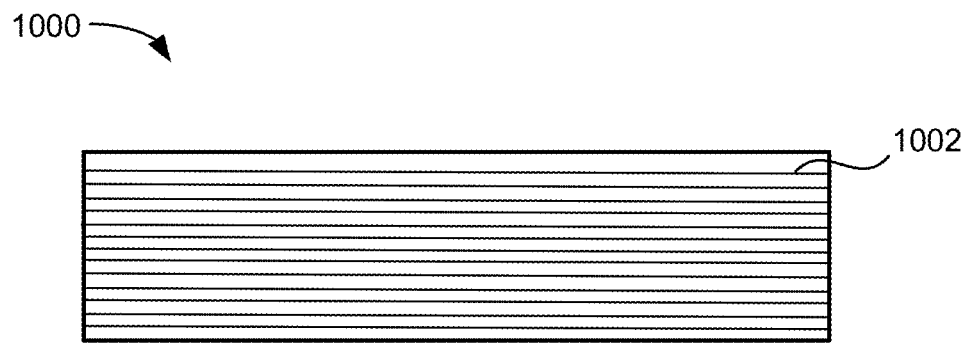
FIG. 10A is a schematic drawing of a portion of a structure having parallel filaments, according to one embodiment.

In one approach, a structure may be formed having printed filaments arranged in parallel to each other in organized rows of filaments. As shown in FIG. 10A, a structure 1000 having a plurality of printed filaments 1002 having gas-filled microballoons in an amount that results in a plurality of printed filaments in substantially straight lines parallel to one another. The plurality of printed filaments 1002 of the structure 1000 may be arranged in parallel to each other along a longitudinal direction.

Figure 10B:
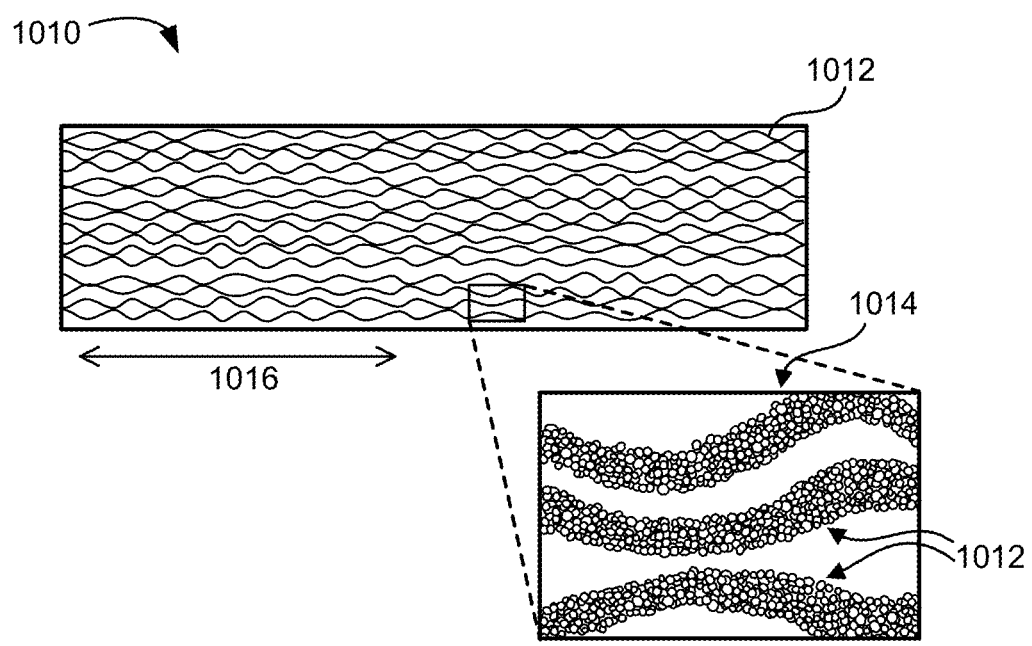
FIG. 10B is a schematic drawing of a portion of a structure having filaments arranged in a sinusoidal pattern, according to one embodiment.

In another approach, post processing of printed filaments formed with siloxane-based inks having unexpanded gas-filled balloons may result in sinusoidal structures. As shown in FIG. 10B, a structure 1010 includes a plurality of printed filaments 1012 arranged about parallel to each other in substantially straight lines parallel to one another. The filaments are printed using an ink comprising a material having an amount of unexpanded gas-filled microballoons in an effective amount to result in at least some of the printed filaments 1012 have a shape corresponding to a periodic wave pattern (e.g., a sinusoidal wave pattern) following post processing to expand the unexpanded gas-filled microballoons. Looking to the magnified portion 1014 of the structure 1010, each of printed filaments 1012 of the structure 1010 may be arranged in substantially parallel to each other may along a longitudinal direction 1016, where at least one of the printed filaments 1012 have a shape corresponding to a periodic wave pattern along the length of the printed filament in the longitudinal direction 1016.

One embodiment includes tuning the chemistry of two inks to be mixed during printing such that both inks would comprise identical components with one ink including gas-filled microballoons and the other ink not including gas-filled microballoons. This approach provides a distinct advantage of eliminating sources of delamination between adjacent printing of dissimilar chemistry between printed layers, resulting in uniform cure and optimal mechanical properties of the printed structure. In a preferred embodiment as described herein, unexpanded gas-filled microballoons are included in the second ink in the place of expanded gas-filled microballoons. The shell of the unexpanded gas-filled microballoons is thermoplastic, so after printing a structure with the ink, heating the printed material having unexpanded gas-filled microballoons will soften the shell of the microballoons thereby allowing the gas in the microballoons to expand. The post processing steps to expand the unexpanded gas-filled microballoons are carefully tuned to allow expansion of the microballoons before curing the matrix material surrounding the microballoons. Conventional use of gas-filled microballoons in forming structures has typically relied on already expanded (at the time of purchase) gas-filled microballoons to preserve the form of the gas-filled microballoon and to avoid heating the microballoons.

According to one embodiment, an ink system for printing a 3D structure includes a first ink and a second ink, where each ink includes a matrix material and a filler. The second ink includes a plurality of unexpanded gas-filled microballoons.

Unexpanded gas-filled microballoons may be defined as polymeric microballoons having a shell having structured copolymer material as described herein. Unexpanded gas-filled microballoons (e.g., microspheres) are spherically-formed particles with a thermoplastic shell encapsulating a gas. When the microballoons are heated the thermoplastic shell softens and the gas increases its pressure resulting in an expansion of the microballoons. Various unexpanded microballoons are filled with a gas that is compressed and may be expanded during post processing steps. An unexpanded microballoon has a smaller initial diameter than an expanded microballoon and expands in response to external stimuli, such as heating, solvent, etc. Various unexpanded gas-filled microballoons may have a similar composition as expanded gas-filled as described herein, such that the unexpanded gas-filled microballoons have been compressed to an unexpanded state prior to addition to an ink. Unexpanded gas-filled microballoons may be obtained commercially.

The amount of unexpanded gas-filled microballoons in the second ink may be in a range of about 0 wt. % to about 20 wt. % of the total weight of a mixture of the first and second ink. In preferred approaches, the amount of unexpanded gas-filled microballoons in the second ink may be in a range of greater than 0 wt. % to about 10 wt. % of the total weight of the mixture of the first and second ink. In one approach, an amount of the unexpanded gas-filled microballoons in the second ink may be in an effective amount to result in an intra-filament porosity in a range of greater than 20 vol. % to about 95 vol. % of the printed structure after post processing of the printed structure.

In addition, in various approaches, microballoons having different softening temperatures may also be added to one or both of the inks, thereby enabling shape memory at different temperatures resulting in tunable, multi-temperature actuated materials. In one approach, the first ink of the ink mixture may include a plurality of second type of unexpanded gas-filled microballoons having a composition different than a composition of the unexpanded gas-filled microballoons of the second ink. In one approach, the second type of unexpanded gas-filled microballoons may have a gas transition temperature that is different than a glass transition temperature of the first type of unexpanded gas-filled microballoons. For example, but not meant to be limiting in any way, an ink system includes a first ink having unexpanded $T_g$44 microballoons and a second ink having unexpanded $T_g$113 microballoons. A proportion of the first ink and the second ink in the ink mixture may be pre-defined and tuned during extrusion of the ink mixture to result in a gradient of the first ink having the unexpanded $T_g$44 microballoons relative to the second ink having the unexpanded $T_g$113 microballoons.

As described herein, referring back to FIG. 1, the matrix material of the ink system may be a siloxane resin. The filler may be a nanosilica filler. The amount of filler in the ink system is included in an effective amount to impart reinforcement while alleviating an increase in viscosity that could obstruct the extrusion process. The filler may function as a thickening agent to ensure appropriate flow of the ink during the printing to ensure the printed structure holds a shape. In some approaches, the amount of unexpanded gas-filled microballoons may be an inverse proportion to the amount of filler needed in the ink. In one approach, an effective amount of unexpanded gas-filled microballoons may replace the filler in the ink mixture such that the unexpanded gas-filled microballoons impart reinforcement and alleviate an increase in viscosity of the ink during extrusion.

In one embodiment, a system includes a polymeric material comprising gas filled microballoons and siloxane polymeric materials that exhibit tunable porosity and shape memory characteristics designed in conjunction with active mixing direct ink write (DIW) manufacturing to produce complex hierarchical foams. In one approach, the system includes: a) a rheologically stabilized printable ink comprising a siloxane, filler, and unexpanded and/or expanded gas-filled polymeric microballoons, b) an active mixing system, c) an extrusion-additive manufacturing system, e.g., DIW additive manufacturing system, and d) a negative pressure curing system.

Figure 11:
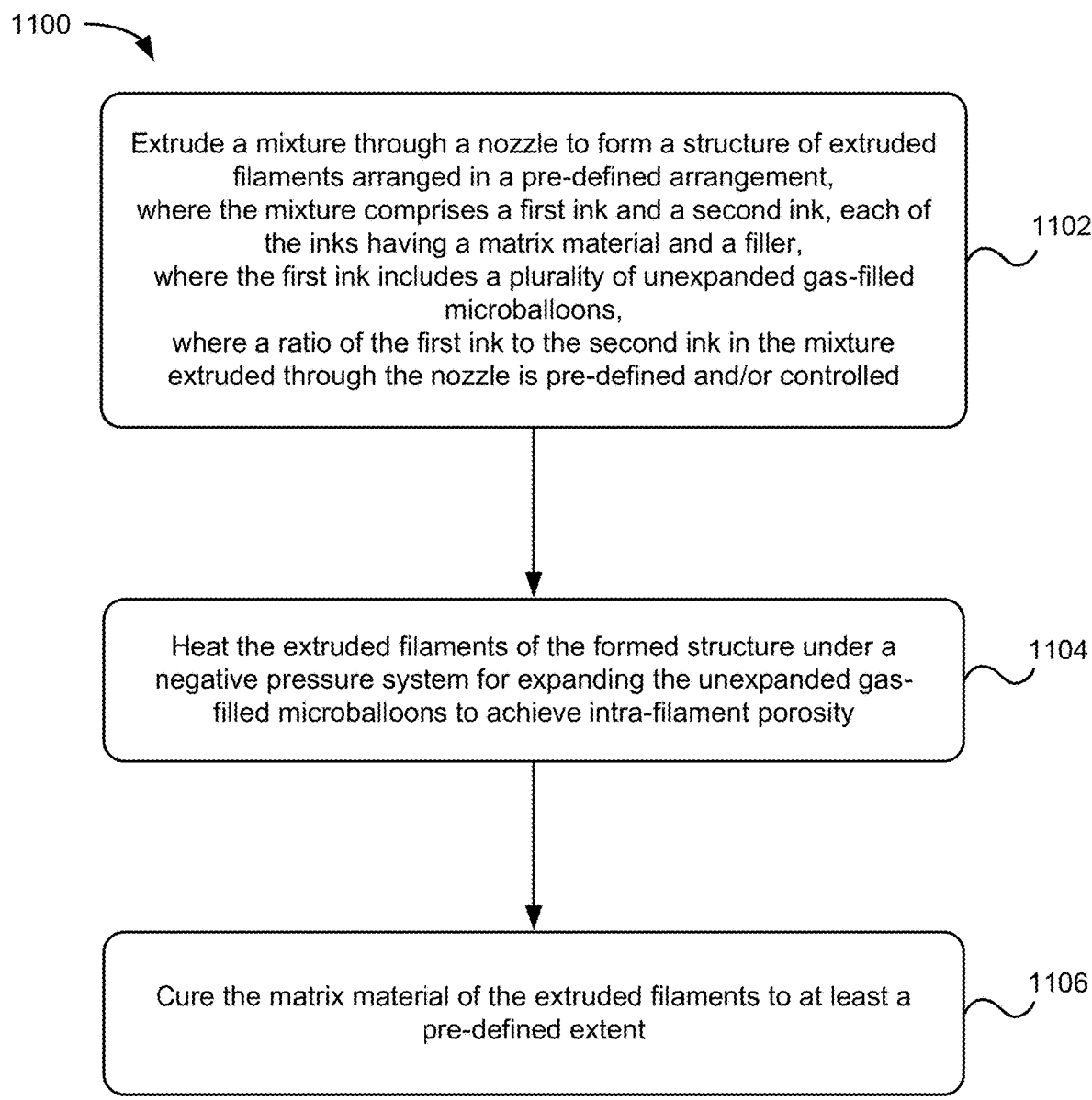
FIG. 11 is a flow chart of a method of forming a porous three-dimensional printed polymer structure having a predefined elastomeric shape memory, according to one embodiment.

FIG. 11 shows a method 1100 for forming a porous three-dimensional printed polymer structure having elastomeric shape memory in accordance with one embodiment. As an option, the present method 1100 may be implemented to form structures such as those shown in the other FIGS. described herein. Of course, however, this method 1100 and others presented herein may be used to form structures for a wide variety of devices and/or purposes which may or may not be related to the illustrative embodiments listed herein. Further, the methods presented herein may be carried out in any desired environment. Moreover, more or less operations than those shown in FIG. 11 may be included in method 1100, according to various embodiments. It should also be noted that any of the aforementioned features may be used in any of the embodiments described in accordance with the various methods.

According to one embodiment, a method 1100 begins with step 1102 of extruding a mixture through a nozzle to form a structure of extruded filaments arranged in a predefined arrangement. The mixture includes a first ink and a second ink, each of the inks having a matrix material and a filler. In one approach, the matrix material may include a siloxane polymer, as described herein. The second ink may include a plurality of unexpanded gas-filled microballoons.

In one approach, the inks include printable non-Newtonian inks that include a filled siloxane-based ink having unexpanded polymeric gas-filled microballoons (e.g., a high porosity ink (HPI)) and a filled siloxane-based ink that may not include polymeric microballoons (e.g., a low porosity ink (LPI)). Preferably, each ink includes similar rheological characteristics. In some approaches, neither ink may be cured until after post processing of microballoons.

A ratio of the second ink having the unexpanded gas-filled microballoons to the first ink in the mixture for extrusion through the nozzle may be pre-defined and/or controlled. In one approach, the first ink and second ink are pre-mixed in the cartridge before extrusion through the nozzle. In one approach, the relative amounts of first and second ink fed to the extruder are adjusted to help define an intra-filament porosity in the final product.

According to one embodiment, an active mixing system includes the precise introduction of one material into the other with active mixing during the printing process, enabling the composition of the material to be varied between low and high porosity. In one approach, a material may be formed by inline mixing two different inks and the porosity of the extruded filaments forming a complex structure may be varied based on the formulation of the material of the inks. For example, one ink may be comprised of a siloxane and filler but not have microballoons, and a second ink would have siloxane and filler plus unexpanded microballoons, such that a free standing structure could be printed with the ink mixture. As described herein, the unexpanded microballoons in the extruded beads forming the filament would be expanded during a post processing step to get them to expand inside the bead that we print, thereby resulting, in one approach, a porosity graduation between low porosity and high porosity in an extruded filament.

In one embodiment, a complex 3D shape of a structure may include a siloxane material having a pre-defined gradient of porosity. In one approach, a predefined gradient print may include a gradient formed from two different inks having different amounts of unexpanded gas-filled microballoons mixed in the nozzle prior to extrusion, with the relative ratio of the inks added to the nozzle changing to create the gradient of unexpanded gas-filled microballoons.

In some approaches, inks may be chemically tailored by incorporating an effective amount of inhibitor additives to prevent curing prior to thermal expansion of the microballoons post printing. In one approach, the mixture may include a polymerization inhibitor. In preferred approaches, the microballoons themselves exhibit a lower glass transition temperature than the cure temperature of the carrier resin (i.e., siloxane-based matrix of the ink) thereby allowing for subsequent thermal processing to expand the microballoons prior to curing of the resin (e.g., siloxane-based matrix of the ink).

In one approach, the first ink of the ink mixture may include a plurality of unexpanded gas-filled microballoons having a glass transition temperature that is different than a glass transition temperature of the plurality of unexpanded gas-filled microballoons in the second ink. The glass transition temperature, as described herein, is the transition temperature that allows the material comprising of the gas-filled microballoons take on a temporary shape at temperatures lower than the glass transition temperature, and then as the temperature rises above the glass transition temperature, the material returns to the original, primary, equilibrium, etc. shape. For example, a structure may be comprised of a material having different zones of shape memory corresponding to the type of gas-filled microballoon present in a defined zone of the material.

In one approach, the shell of a different type of gas-filled microballoon may have a different chemistry. For example, a glass transition temperature of the shell material may be varied such that the expansion of the microballoons may be tuned (e.g., temperature, timing, etc.). In one approach, unexpanded microballoons and expanded microballoons may be present in a single material. In one approach, a method may form a printed structure using different inks with different gas-filled microballoons that are expanded at different temperatures. For example, the gas-filled microballoons may sequentially expand at certain temperatures, or during post processing at a given temperature, one subset of gas-filled microballoons partially expands while a second subset of gas-filled microballoons fully expands.

Figure 12A:
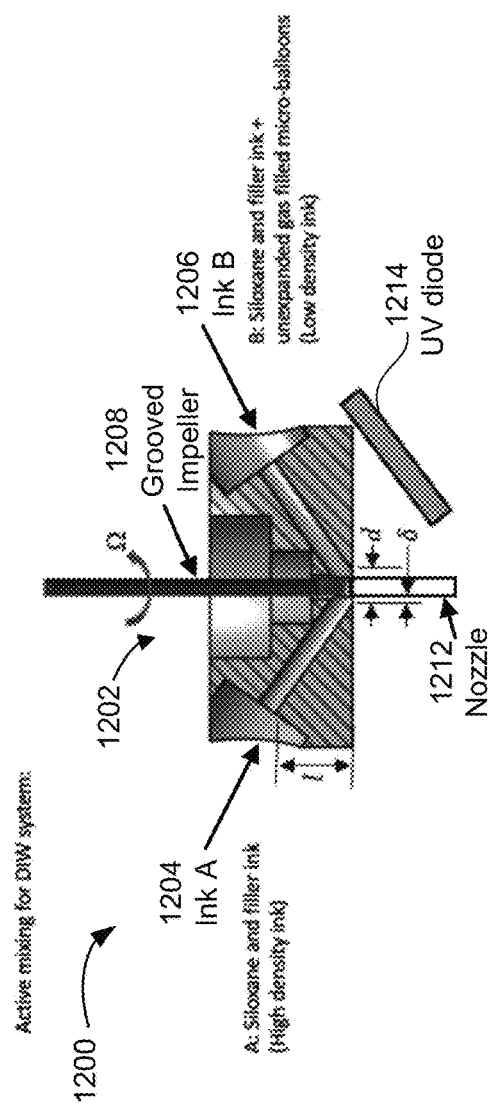
FIG. 12A is a schematic drawing of a mixing print head for extrusion of an ink.

According to one approach of the method, the extruding technique includes a direct ink writing (DIW) system. The schematic drawing in FIG. 12A illustrates an active mixing system 1200 for a DIW system showing a cross-sectional view of a mixing chamber 1202. The mixing chamber 1202 includes a grooved impeller 1208 for mixing an Ink A 1204 and an Ink B 1206 within a mixing chamber 1202 before extrusion through a nozzle 1212 of the mixing chamber 1202. In one example, Ink A 1204 may be a high density ink (e.g., low porosity ink) comprising siloxane and a filler, and Ink B 1206 may be a low density ink (e.g., high porosity ink) comprising siloxane and a filler and unexpanded gas-filled microballoons. The addition of each ink, Ink A 1204 and Ink B 1206, may be tuned to create a compositional gradient of one of the inks resulting in a gradient of porosity of the extruded mixture.

In preferred approaches, the printed structure includes an intra-filament porosity that is characterized as a closed cell porosity and inter-filament porosity corresponding to the complex geometric arrangement of the printed filaments that is characterized as an open cell porosity. The printed structure may have a tuned closed cell porosity and a tuned open cell porosity. A printed structure may have a gradient of closed cell porosity in material of the printed filaments of the structure and/or have a gradient of open cell porosity corresponding to the arrangement of the printed filaments of the structure.

In another approach, a predefined gradient print may include a gradient formed from two inks having different porosities mixed prior to addition to the nozzle, with the relative ratio of the inks added to the nozzle changing to create the gradient of porosity in the direction of extrusion. In yet another approach, a predefined gradient print may include each layer of the structure having a different ratio of two inks resulting in a layer having a defined porosity, and the plurality of layers forming a gradient of porosity in the structure.

In one approach, a method of forming a structure may include using a DIW system with more than one print heads, mixing apparatuses, cartridges, etc. A gradient of porosity, composition, density, etc. may be formed during extrusion of a filament by adding a different printing head into the DIW system. The second printing head may have at least one different ink or combinations of inks that form a different gradient than the gradient formed with the first print head. A single print head having two inks may create a gradient in which the gradient of composition of one ink relative to the second ink allows the combination of inks to bleed into each other. Adding a second print head with at least one ink having a new composition of unexpanded gas-filled microballoons, and maintaining the same matrix material may define a more abrupt change in the composition of unexpanded gas-filled microballoons within single printed filament, layer, structure, etc.

In some approaches, the diameter of the extruded filament may be tuned by adjusting the extrusion speed (i.e., how fast the material is extruded through the nozzle), the movement of the base receiving the extruded filament, etc. In one approach, the printing pressure, beads, etc. may be varied to adjust the average span of the diameter of the extruded filament and maintain a constant span of diameter during a change in the density of the ink. For example, low density areas (having higher concentrations of unexpanded gas-filled microballoons) may be printed using a narrower bead, and higher density areas (having lower concentrations of unexpanded gas-filled microballoons) may be printed using a thicker bead, such that the thickness of the bead may be graded corresponding to the density of the ink so that the average span of diameter of the extruded filament is similar along the length of the filament having a gradient of porosity post processing. Preferably, the dimensions of the structure (e.g., average diameter of the filament) are substantially uniform, however, each filament may have a defined gradient of density along the length of the filament. In one approach, macroporosity (e.g., inter-filament porosity formed from the arrangement of filaments) would be the same, but the intra-filament porosity would be different depending on the gradation of gas-filled microballoons present in the material of the filament.

Figure 12B:
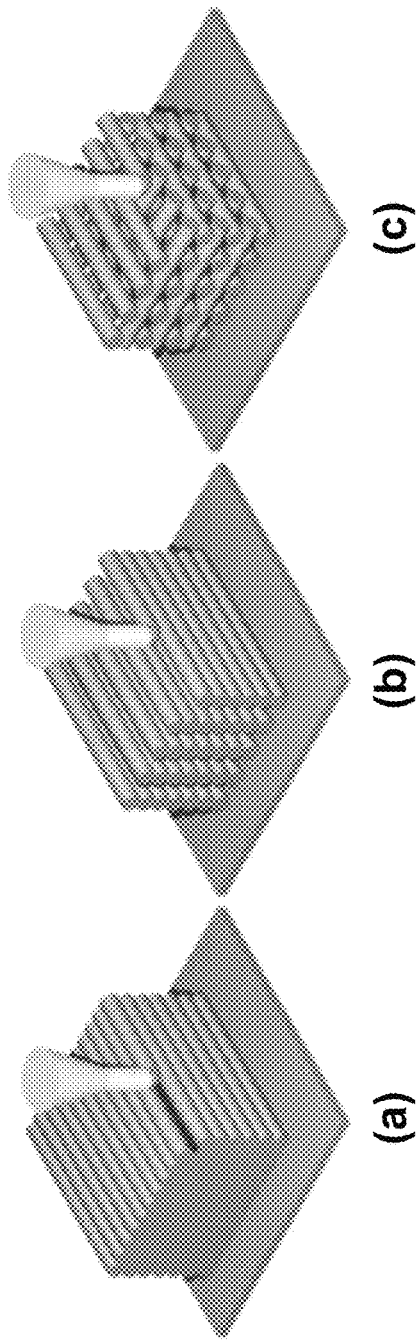
FIG. 12B is a schematic drawing of raster direct ink writing. Part (a) depicts a raster write print in parallel having no printed porosity, part (b) depicts a raster write print in parallel with porosity, and part (c) is a log-pile structure of printed filaments.

In various approaches, the formed structure may have an inter-porosity defined by the arrangement of extruded filaments. As illustrated in FIG. 12B, a DIW printing system may extrude a filament to form various complex structures. In one approach, as shown in parts (a) and (b), a DIW printing system may be an extrusion-based system where the mixture is extruded in a raster process based on three-dimensional coordinate system. The system as illustrated in part (a) includes the extruded filaments positioned in parallel having an offset to the extruded filaments in the adjacent lower layer. As shown, using a raster write (RW) technique, the pitch is about equal to the rod diameter with no rotated layers. The system as illustrated in part (b) includes the extruded filaments positioned in parallel and directly above the extruded filaments in the adjacent lower layer. As shown, the pitch may be greater than the rod diameter with no rotated layers. The system as illustrated in part (c) includes a log pile structure of extruded filaments in which each layer of extruded filaments positioned in parallel has a series of filaments positioned orthogonal to the extruded filaments in the adjacent lower layer. As shown, the pitch may be greater than the rod diameter, and every other layer is rotated by 90 degrees. These formed structures by DIW are for example only and are not meant to be limiting in any way.

In one approach, a method of forming a structure may include printing a structure using a projection microstereolithography ($P_\mu SL$) system. In one example, a multi-copolymer resin may be used of which one portion of the resin is cured by UV light and a second portion of the resin remains uncured during the printing forming a gel having a plurality, a gradient, etc. of unexpanded gas-filled microballoons, e.g., a green body comprising the unexpanded gas-filled microballoons.

Method 1100 continues with step 1104 of heating the extruded filaments of the formed structure under a negative pressure system for expanding the unexpanded gas-filled microballoons to achieve intra-filament porosity. Step 1104 is a post-processing step following extrusion of the inks forming a structure of extruded filaments. In various approaches, the post processing step includes a technique to expand the unexpanded gas-filled microballoons by an external stimuli, e.g., heat, solvent, etc.

In addition, techniques to expand the unexpanded gas-filled microballoons may include different curing parameters and different energies to cure the material such that the unexpanded microballoons expand before the material is cured. For example, techniques for heating the gas within the unexpanded gas-filled microballoons may include microwaves, sound, etc.

In various approaches, a negative pressure curing system for microballoon expansion and carrier resin curing may include a negative pressure vessel, such as a vacuum oven, while heating the material by a resistive heating technique, an infrared radiation technique, a radiative technique, a microwave radiative technique, sonic heating (e.g., a thermoacoustic technique, ultrasound, etc.), a vibration technique, etc. of microballoons for expansion. In various approaches, a preferred technique, that may or may not be identified herein, has the capability of expanding the shell and the gas within the gas-filled microballoon without curing the matrix material surrounding the gas-filled microballoons. Moreover, a subsequent cure of polymer carrier resin by thermal, microwave, acoustic, photo-based curing methods preferably occurs post microballoon expansion, as described below in the next step of the method.

In an alternative approach, the heating of the extruded filaments may be replaced with treating the extruded filaments with a solvent to soften the shells of the unexpanded gas-filled microballoons in the material of the filaments. A solvent may change the glass transition temperature of the gas-filled microballoons thereby softening the shells and allowing the gas to expand in the absence of applied heat.

In one approach, the mixture may include plasticizing agents. For example, plasticizing agents such as solvents may be introduced during printing to induce microballoon expansion during thermal/negative pressure post processing. In some approaches, the mixture may include a curing agent.

In one approach, the method may include applying an additional curing technique during extrusion of the mixture for partially curing the matrix material. For example, looking back to FIG. 12A, a UV diode 1214 may be positioned near the nozzle 1212 of the mixing chamber 1202 for partially curing the matrix material during extrusion. In one approach, the siloxane polymer of the ink may be partially cured during extrusion of the filament. The partially cured matrix material enables selective constraint of the microballoons. For example, for approaches using a single ink with unexpanded gas-filled microballoons, portions of the structure may be printed in the presence of UV light for partial curing of the matrix material surrounding the unexpanded microballoons and portions of the structure may be printed in the absence of UV light so the unexpanded microballoons could expand to their full extent. In preferred approaches, the portions of the extruded filaments, portions of printed structure, etc. that are partially cured or not cured may be pre-defined to allow for select encapsulation of the unexpanded microballoons by the matrix material of the ink thereby resulting in variable pre-defined zones of porosity in the structure corresponding to the extent of expansion of the unexpanded gas-filled microballoons of a single ink. In another approach, by varying the concentration of microballoons within the structure, different degrees of shape memory may be imparted in different areas resulting in a "graded" shape memory.

According to one embodiment, a system including an ink having high glass transition temperature-type of unexpanded gas filled microballoons may allow for higher porosity and higher porosity foams. Moreover, in preferred approaches, varying of chemical composition of two chemically and rheologically similar polymer inks (e.g., siloxane-based inks) that have UV and/or thermal curing properties allows the induction of variable intra-strand porosity. In a preferred approach, a system includes an active mixing of at least two inks prior to extrusion to print a filament having a defined gradient of porosity through the structure, e.g., from high porosity to low porosity without changing the nozzle of the extrusion process.

In one approach, a method includes extruding filaments arranged in parallel using a raster write system (as shown in parts (a) and (b) of FIG. 12B) to print a material having a concentration of unexpanded gas-filled microballoons in an effective amount to generate a periodic wave pattern (e.g., a sinusoidal pattern) of the printed filaments post processing (as shown in FIG. 10B). The generation of a sinusoidal pattern in the printed filaments post processing was a surprising result since structures formed with lower concentrations of unexpanded gas-filled microballoons using similar printing parameters did not result in a periodic wave pattern post processing. Without wishing to be bound by any theory, it is believed that the raster printing of the filaments having the higher concentration of unexpanded gas-filled microballoons constrains each filament with adjacent filaments on either side having similar higher concentration of unexpanded gas-filled microballoons, thereby resulting in a periodic wave pattern of the filament when the unexpanded gas-filled microballoons are expanded.

In some approaches, a structure having printed filaments arranged in a periodic wave pattern might be advantageous for cushioning products, e.g., egg crates. The mechanical response of the product post processing may be tuned according to the concentration of unexpanded gas-filled microballoons included in the ink used for extrusion. A structure may be tuned (e.g., made stiffer, made softer, changing mechanical response, etc.) during formation and arrangement of the extruded filaments, and then after formation of the structure, a sinusoidal pattern of the printed filaments may be generated post processing by simply expanding the unexpanded gas-filled balloons using a heating technique as described herein. A sinusoidal-type structure may be formed post-printing of the original structure.

Referring to FIG. 11, step 1106 of method 1100 includes curing the matrix material of the extruded filaments to at least a pre-defined extent. In various approaches, a technique for curing the matrix material of the extruded filaments may include one of the following: a resistive heating technique, an infrared radiation technique, a radiative technique, a microwave radiation technique, a thermoacoustic technique, or a photo-based technique.

In some approaches, the temperature for heating the material of the extruded filaments for expanding the gas-filled microballoons may be similar to the temperature for curing the matrix material of the extruded filaments. In some approaches, the temperature may be in a range of greater than 75° C. to about 100° C. The preferred temperature allows expansion of the gas-filled microballoons under negative pressure within a duration of time before the matrix material is cured at a similar temperature. The matrix material preferably is substantially cured over a time duration of about 4 to 8 hours at the temperature for expanding the gas-filled microballoons.

In one approach, after expansion of the gas-filled microballoons and the matrix material is cured to a sufficient extent for maintaining the expanded shape of the gas-filled microballoons, the negative pressure may be lowered, stopped, etc.

Experimental Methods

Materials

Polydimethylsiloxane resin (Dow Corning® SE 1700, Midland, Mich.) with nanosilica filler for yield stress behavior and fracture toughness was used as the matrix phase in this study. The effect of microballoon shell material behavior on DIW structure compressibility was studied using two commercially available materials. $T_g 44$ microballoons are characterized as isobutane filled, thermally expanded poly (acrylonitrile-co-vinylidene chloride-co-methyl methacrylate) microspheres (AzkoNobel Expancel® 551 DE 40 d42, Duluth, Ga. 30096) with a gas displacement density of 0.042 g/cc and with a glass transition temperature, $T_g$, of 44° C., measured using thermomechanical analysis (FIG. 3A) rather than dynamic scanning calorimetry due to their extremely light weight. The $T_g 44$ microballoons are depicted in the optical microscope image in FIG. 4B.

Figure 3B:
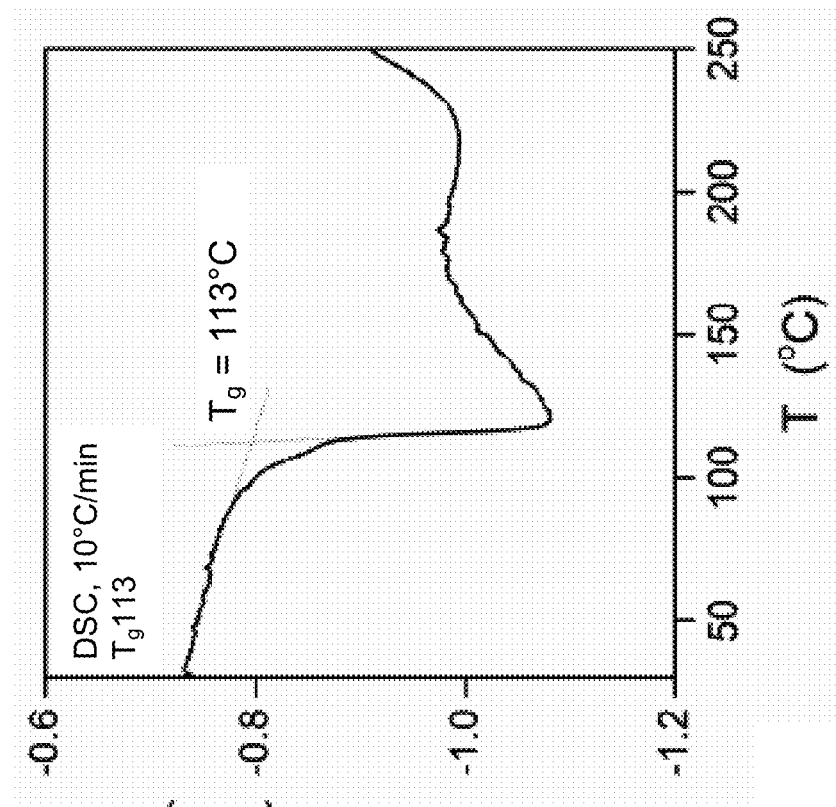
FIG. 3B is a plot of thermodynamic behavior of $T_g113$ microballoons assessed by dynamic scanning calorimetry.
Figure 3A:
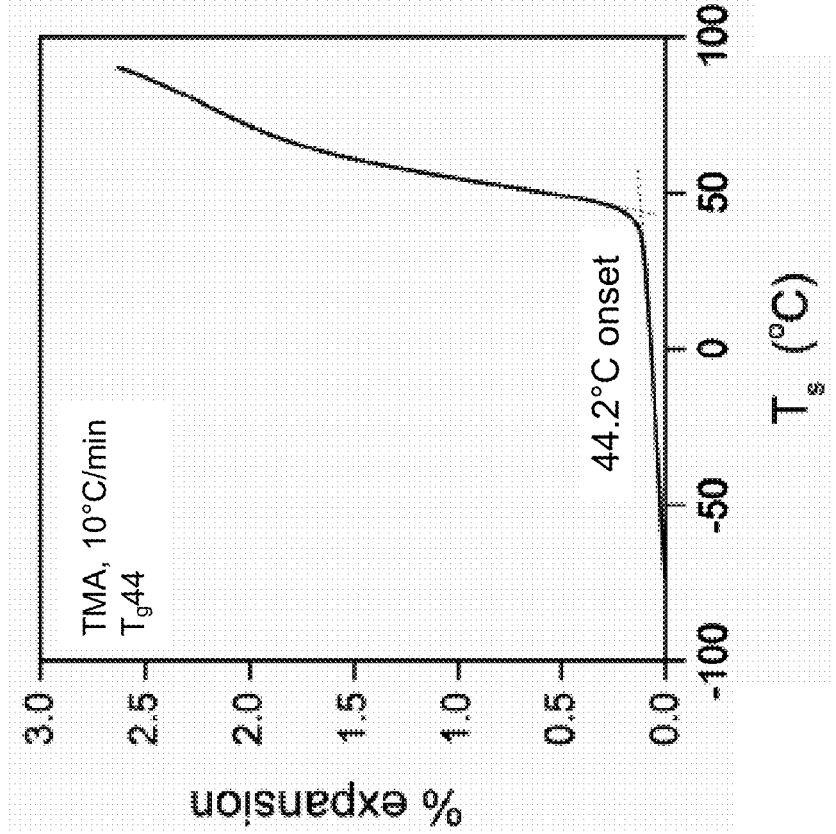
FIG. 3A is a plot of thermodynamic behavior of $T_g44$ microballoons assessed by thermomechanical analysis.

$T_g 113$ microballoons are characterized as formaldehyde resin shell microspheres (Asia Pacific Microspheres BJO-0930, Selangor Darul Ehsan, Malaysia) with a liquid displacement density of 0.21-0.25 g/cc. These phenolic microballoons possess a $T_g$ of 113° C., as measured using dynamic scanning calorimetry (FIG. 3B). The $T_g 113$ microballoons are depicted in the optical microscope image in FIG. 4C.

Particle cross-sectional areas were measured using automated transmitted light microscopy (Malvern Morphologi G3, Westborough, Mass. 01581) and the particle size distribution was calculated assuming the particles are spherical.

DIW Ink Preparation

A volumetric loading of 40% microballoons in the silica filled siloxane resin was used as a standard to compare the two microballoon materials. This selection was made on the basis that 40 vol % filler content would not result in significant jamming and thickening behavior given the broad size distributions yet may have a significant impact on the overall mechanical performance of printed structures.

Resin was prepared by blending 40 vol % microballoons into the siloxane base resin (SE 1700 Part A base, Dow Corning, Auburn, Mich. 48611) using a vacuum gravitational mixer (Thinky ARV 310, Laguna Hills, Calif. 92653) at 2000 rpm for 1 min. After this time, the microballoon resin mixture was hand mixed, followed by another round of noncontact mixing under vacuum at 2000 rpm for 1 min. While no noticeable heating occurred during blending, the material was allowed to cool in a standing water bath for 5 min, prior to non-contact mixing of SE1700 Part B curing agent at 2000 rpm for 20 s. The microballoon suspension was transferred to a 30 cc syringe for printing.

Ink Rheology

Figure 5A:
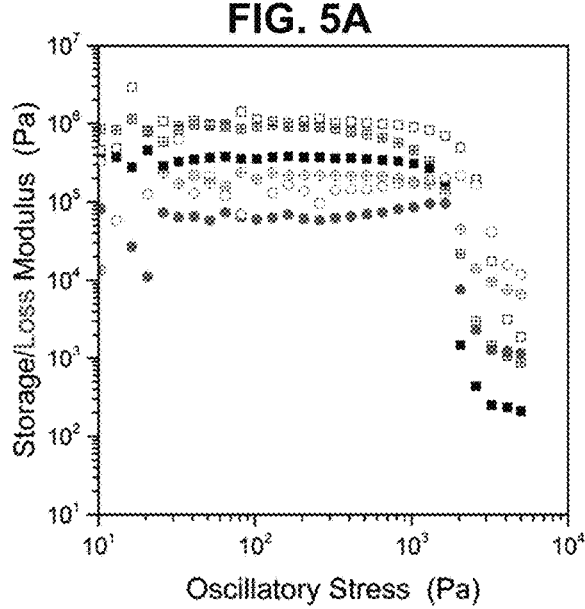
FIG. 5A is a plot of rotational oscillatory response on storage and loss moduli of structures formed with matrix, matrix+$T_g44$ microballoons, and matrix+$T_g113$ microballoons.
Figure 5B:
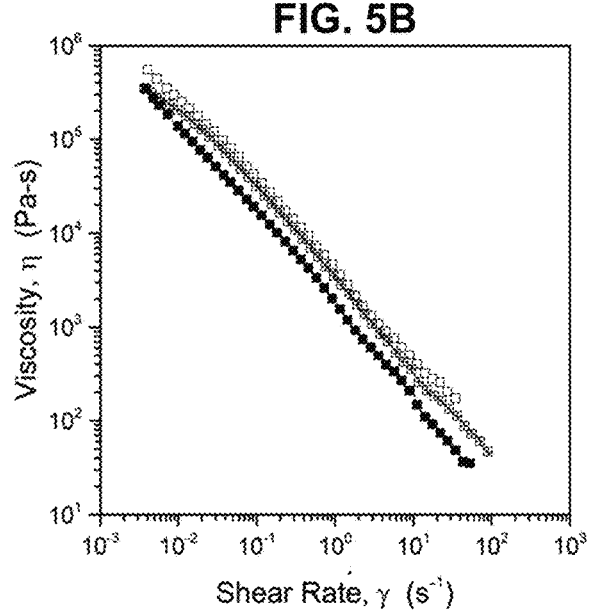
FIG. 5B is a plot of continuous flow behavior of ink containing matrix, matrix+$T_g44$ microballoons, and matrix+$T_g113$ microballoons.

The effect of microballoon addition on the rheological behavior of siloxane resin was evaluated using rotational rheology (TA Instruments AR 2000ex (New Castle, Del. 19720) equipped with cross-hatched parallel plates to prevent microballoon compression and mitigate wall slip effects). Oscillatory experiments (FIG. 5A) were performed at 10 Hz and power law behavior was observed under continuous flow (FIG. 5B).

DIW Printing

Printing was performed using a displacement controlled 3-axis 3D printing platform, resulting in cross-ply structures 306 with each subsequent layer fashioned at a 90° angle from the one prior, as described above in FIG. 4D. Structures having face-centered tetragonal (FCT) were produced. A 250 µm nozzle was used to produce prints of 50×50 mm squares at 8 layers thick. Printed structures were oven cured under a nitrogen purge for 6 h at 60° C., followed by 1 h at 150° C. and a post cure at 125° C. for 12 h. These structures possessed overall densities of 0.50 g/cc and 0.42 g/cc using 40 vol % of the $T_g 113$ and $T_g 44$ microballoons, respectively.

Thermal and Mechanical Characterization

Mechanical response was evaluated under compressive loading supplied by an Instron 5944 universal testing frame equipped with a 2 kN load cell. Strain was measured using a 0.5" strain gage extensometer on 2.2 cm (⅞ in) diameter, 1.6 mm thick printed FCT specimens. Compression set was assessed on printed FCT structures punched to 13 mm diameter and 1.6 mm thick (8 layers). Following the active standard test method for rubber property (ASTM D395), printed structures were compressed to 40% and 60% strain and soaked at 70° C. for 70 h, cooled under compression, released and allowed to relax for 10 min, prior to measurement. To evaluate recovery, specimens were reheated at temperatures equal to or greater than that of the compressed soak for a series of times until no further structural changes were observed.

Figure 7:
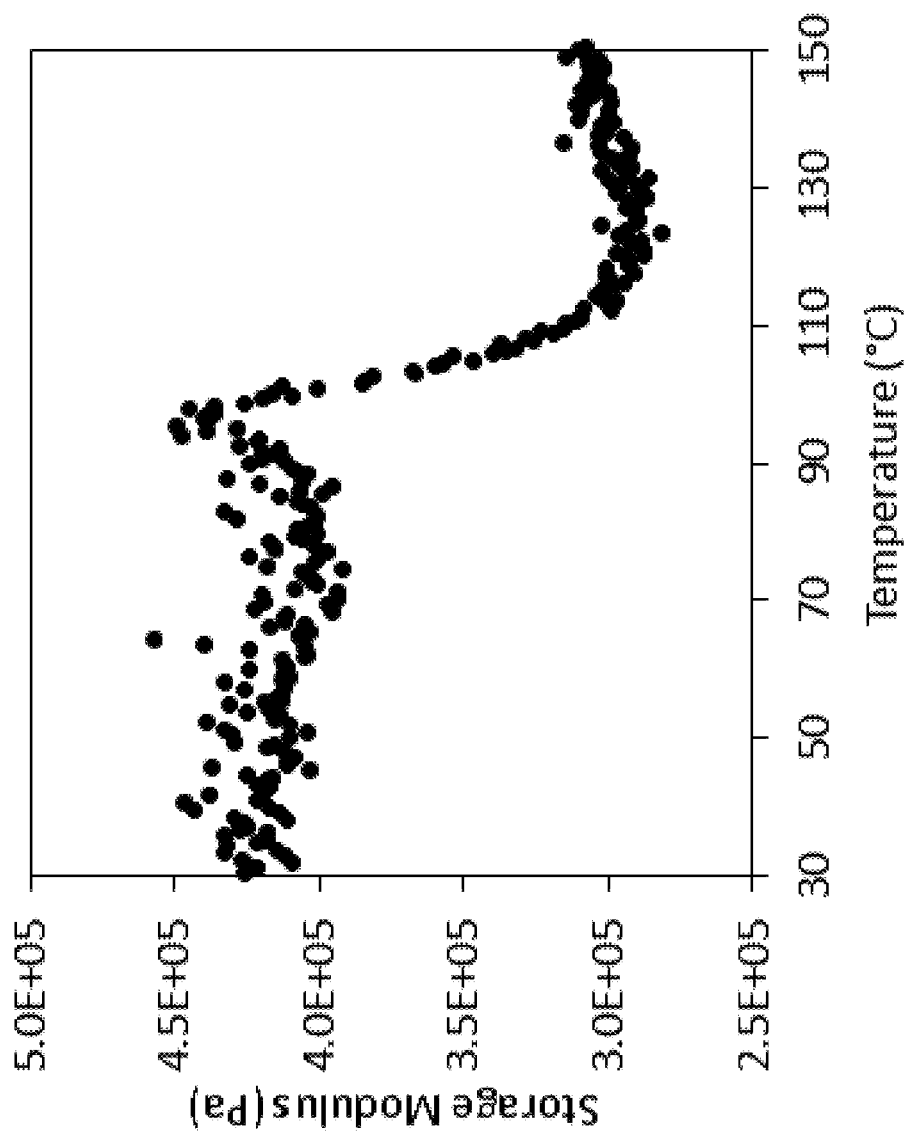
FIG. 7 is a plot of storage modulus as a function of temperature of a cast structure formed with matrix+$T_g44$ microballoons (40 vol % $T_g44$), according to one approach.

Dynamic mechanical thermal analysis (oscillatory compression) was performed to illustrate the shape memory actuation transition of a cast structure with 40 vol % $T_g 44$ microballoons in the matrix (FIG. 7).

Experimental Results

3D Printed Materials

FIGS. 4A-4C illustrate the two different gas filled microballoon pore former particle size distributions used to evaluate the effect of shell stiffness and glass transition temperature, on compressive behavior and shape memory in 3D printed structures. The circular effective diameter values are shown in FIG. 4A ($T_g 44$, solid line; $T_g 113$, solid line with closed circles). Optical microscopy images of microballoons are shown in FIG. 4B ($T_g 44$ microballoons) and FIG. 4C ($T_g 113$ microballoons) Despite the difference in particle size distribution between the two microballoon lots, shell thickness for each was measured to be 1-2 µm using scanning electron microscopy and optical microscopy of fractured particles. Note that there are a significant fraction of doublets and triplets in the $T_g113$ system (FIG. 4C), as opposed to the $T_g44$ system (FIG. 4B).

FIGS. 4E-4G are optical images of printed silicones with microballoons showing the x-y view (FIG. 4E), the x-z view (FIG. 4F), and a high magnification of the image shown in FIG. 4F showing microballoons in a printed filament (FIG. 4G).

Rheological Behavior

To achieve optimal elastomeric flow behavior for the composite inks, stress controlled rotational rheology experiments were performed using a variety of conditions with a typical microballoon loading of 40 vol. %. The effect of microballoons on rotational oscillatory response is shown in FIG. 5A. Under oscillatory flow at a frequency of 10 Hz, the effect of 40 vol % microballoon addition ($T_g44$ as open squares, $T_g113$ as squares with cross) manifested as an increase in storage modulus as compared to resin without microballoons (closed squares). Under similar conditions, the effect of microballoon addition ($T_g44$ as open circles, $T_g113$ as circles with cross) manifested as an increase in loss modulus as compared to resin without microballoons (closed circles).

The effect of microballoons on continuous flow behavior of the ink is shown in FIG. 5B. As shown, there was a slight increase in yield stress in the case of the $T_g44$ resin, while maintaining printability. No permanent die swell was observed through either measurement of printed strands or in situ measurement of flow near the die exit (FIG. 5B, without microballoons, solid squares; 40 vol % $T_g44$, open squares; 40 vol % $T_g113$, square with cross). This may have been attributable to power law behavior due to wall slip/plug flow, indicating that no configurational entropy was recovered upon nozzle exit.

Subtle influences of the pore former size distribution and volume loading on rheological behavior were observed. However, printability and structural repeatability was minimally affected.

Mechanical Response

Figure 5C:
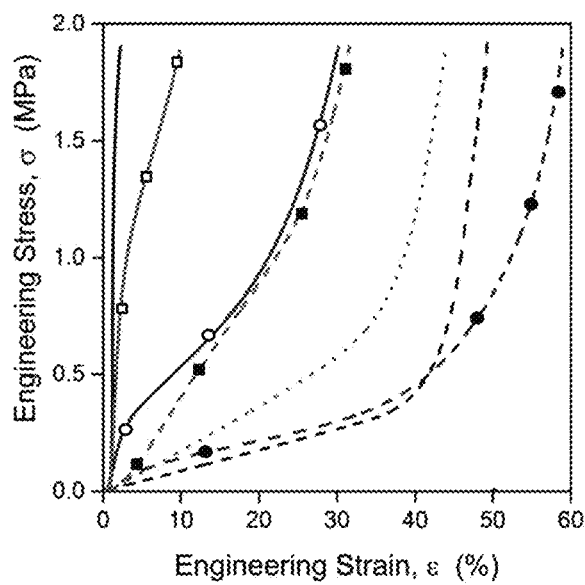
FIG. 5C is a plot of response to compressive loading of cast and 3D printed structures, according to various approaches.

The effect of microballoons on the response to compressive loading of cast and 3D printed structures is shown in FIG. 5C. To isolate the effect of structural porosity from intrastrand porosity, both bulk and printed structures were evaluated. Applied deformation (strain measured along x-axis) resulted in a nonlinear stress response (as indicated on y-axis), with a change in slope or elastic modulus at 1000 kPa and 300 kPa. A cast structure of siloxane matrix without polymer microballoons (solid black line) does not demonstrate significant compactness in terms of engineering strain in response to compressive loading. In contrast, a 3D printed structure of siloxane matrix without polymer microballoons (e.g., 3D printed in cross-ply, alternating 0° to 90° layered structures referred to as face-centered tetragonal) (dashed black line) demonstrated two regimes of compression response. In the first regime below 300 kPa in which strain was less than 40% E, deformation of the siloxane matrix was dependent on the structural porosity of the architecture, for example, 3D printed structures are more susceptible to compaction and inlaying of upper layers in layers below. In the second regime, at higher stress, deformation appeared to be dependent on strand material properties.

In some approaches, the transition between the two regimes (structural porosity vs strand material properties) may be referred to as structural lock-up. The first regime dependent on structural porosity may be a deformation mechanism of strand nestling in the FCT-printed structures during compression loading.

In cast structures of siloxane matrix with polymer microballoons, each cast structure was filled with 40 vol % microballoons. There was a compression response in each of the structures and zero deformation was determined based upon a minimum applied or supported load. The cast siloxane matrix with $T_g113$ microballoons (solid line with open squares) demonstrated a slight compression with approximately 9% strain in response to compression.

The inclusion of the $T_g44$ microballoons may minimally affect the first regime of response (structural porosity) yet may substantially lower the material stiffness of the structure in the second regime (above 40% strain). As shown in FIG. 5C, the cast of the siloxane matrix with $T_g44$ microballoons (solid line with open circles) demonstrated a remarkable 27% strain in response to compression to 1.9 MPa; this effect may be attributed to the compressibility of $T_g44$ microballoons. Thus, the cast siloxane matrix with $T_g44$ microballoons showed strand material properties (e.g., reduced material stiffness) independent of structure porosity. Furthermore, the cast siloxane matrix with $T_g44$ microballoons demonstrated compressibility of the $T_g44$ microballoons.

In contrast, the cast siloxane matrix with $T_g113$ microballoons demonstrated that the $T_g113$ microballoons may be considerably stiffer than the $T_g44$ microballoons. Strain in these compacted structures was attributed to yielding of the microballoons. Without wishing to be bound by any theory, it is believed that the lower stiffness observed above 0.5 MPa of the cast siloxane matrix with $T_g113$ microballoons may be attributed to the fracture of the glassy microballoon shell in the matrix.

In the 3D printed structures filled with microballoons, different vol % of microballoons was assessed and demonstrated the effect of microballoon mechanical properties on open cell 3D printed structures. In 3D structures filled with 40 vol % $T_g113$ microballoons (dashed line with solid squares), a stiffer material response was observed compared to 3D printed structures without microballoons (dashed line), thereby suggesting that, at 40 vol %, the glassy, rigid microballoons inhibit structural motion/strand nestling. The effect of the $T_g113$ microballoons was lessened in the 3D printed structure of 25 vol % $T_g113$ microballoons (dotted line) which exhibited greater deformation below 600 kPa. The strain accommodated during the first regime was reduced, e.g., from ~40% to 35% ε in comparison with the strain accommodated by a structure printed using matrix material only (dashed line). For 3D printed structures of 25 vol % (dotted line) and 40 vol % (dashed line with solid squares) $T_g113$ microballoons, the stiffness of the material above the lock-up stress (i.e., the point at which structural porosity becomes very small) in the microballoon-filled printed structures was comparable to that of the 3D printed siloxane structure without microballoons (dashed line).

Conversely, the lower stiffness of the $T_g44$ microballoons did not increase structural resistance to compression. In fact, as shown with the 3D printed structure with 40 vol % $T_g44$ microballoons (dashed line with solid circles), the structure demonstrated lower stiffness response throughout loading beyond structural lock up or interlayer compaction.

Shape Memory Behavior

FIG. 6A depicts a schematic illustration of the shape memory experiment. In order to assess the long term effect of microballoon addition on structural performance, shape memory evaluations were quantified by compression set.

The shape memory experiment included a compression set as illustrated in parts (a), (b), and (c). Part (a) illustrates the before testing or initial state in which the printed structure 506 is placed between two spacers 504 with the movable compression stages 502 above and below the printed structure 506. The height $h_o$ of the printed structure 506 before testing is equal to the distance between the top and bottom of the printed structure 506, and the compression stages 502 contact the top and bottom of the printed structure 506 without compression.

Part (b) of FIG. 6A illustrates applying a compression load to the printed structure 506, where compression stages 502 apply a strain ε to the printed structure 506. The compression load at a certain strain ε may be maintained by securing the compression stages 502 with bolts 508. In some approaches, the compression load may be applied during a thermal soak, for example, at temperatures of 40° C., 70° C., 110° C. At a certain strain $\varepsilon h_o$, the height $h_c$ of the printed structure 506 under compression may be defined as follows.

$$h_c = (1-\varepsilon)h_o \qquad \text{Equation 1}$$

In some approaches, the printed structure may be cooled under compression.

Part (c) of FIG. 6A illustrates the release of the printed structure 506 from the compression load applied in part (b) such that the printed structure 506 is uncompressed. In various approaches, the release from compression load may take place at different temperatures, for example, 70° C., 110° C., etc. The height h of the uncompressed printed structure 506 is the distance from the bottom of the printed structure to the top of the printed structure in the uncompressed state.

FIG. 6B shows shape memory behavior following a thermal soak under compressive strain at 70° C. for 70 hours. Solid black bars depict recovery after compressive strain at 40% £, diagonal stripe bars depict recovery of the samples compressed to 40% strain after reheating at 70° C. for 30 minutes, solid white bars depict recovery after compressive strain at 60% £, horizontal stripe bars depict recovery of the samples compressed to 60% strain after reheating at 70° C. for 30 minutes, and vertical stripe bars depict recovery of the samples compressed to 60% strain after heating at 110° C. for 2.5 hours. Percent recovery was determined as a ratio of the recovered thickness to the compressive deformation.

Neat siloxane prints ("neat resin" in FIG. 6B) exhibited a small but measurable compression set at 40% (black bar) and 60% strain (white bar) when held at 70° C. for 70 hours. This thickness change was somewhat recoverable after reheating to 70° C. for 30 minutes (diagonal stripe bar, horizontal stripe bar).

The addition of 40 vol % $T_g113$ microballoons resulted in 20% reduction in thickness after compression set following the same heating schedule at 40% (black bar) and 60% strain (white bar). None of this deformation was recoverable after reheating to 70° C. for 30 min (diagonal stripe bar, horizontal bar).

The addition of 40 vol % $T_g44$ microballoons resulted in 45% and 57% reduction in thickness, following the same heating schedule at 40% (black bar) and 60% strain (white bar), respectively. The structure with $T_g44$ microballoons experienced noticeable recovery upon reheating, recovering 10-15% thickness at 70° C. for 30 min (diagonal bar, horizontal bar). Complete thickness recovery was observed upon reheating to 110° C. for 2.5 hours (vertical bar). The ability to retain a compressed shape after thermally soaking and cooling and then recover the original shape upon unconfined reheating is a property associated with shape memory polymers (SMPs).

Looking to FIG. 6C, shape recovery of the 40 vol % $T_g44$ microballoon print structures was dependent on soak and reheat temperatures. The dark shaded bars show percent recovery after compressed soak, "after soak." The light shaded bars show percent recovery after reheating, "after reheat." The 40° C. treatment included a thermal soak at 40° C. with a strain of 60% £ for 10 minutes (dark shaded bar) followed by reheating at 40° C. for 48 hours (light shaded bar). Some shape memory recovery was demonstrated.

The 70° C. treatment included a thermal soak at 70° C. with a strain of 60% £ for 10 minutes (dark shaded bar) followed by reheating at 70° C. for 51 hours (light shaded bar). There was significantly more compression at 70° C. compared to the 40° C. treatment as well as shape memory recovery.

The 110° C. treatment included a thermal soak at 110° C. with a strain of 60% £ for 10 minutes (dark shaded bar) followed by reheating at 110° C. for 2.5 hours (light shaded bar). The higher temperature of thermal soak demonstrated greater compression (dark shaded bar) resulted in full shape recovery of the original shape following reheating (light shaded bar).

For both the 70° C. and 110° C. treatments, the first shape recovery effect was most pronounced at temperatures above the glass transition temperature, $T_g$, of the microballoons (in the case of FIG. 6C, the $T_g$ is 44° C.).

As shown in the optical images of FIGS. 6D-6F, shape recovery of the 40 vol % $T_g44$ microballoon print structures, as graphically depicted in the 110° C. treatment of FIG. 6C, was evidenced by recovery of structural porosity and retention of microballoon spherical shape. FIG. 6D shows the initial state of a 40 vol % $T_g44$ microballoon print structure before compression. FIG. 6E (middle image) shows the specimen cross section after compressed soak at 110° C. at 60% £ for 10 minutes. FIG. 6F shows the recovered state of the 40 vol % $T_g44$ microballoon print structure after reheating at 110° C. for 2.5 hours.

FIG. 7 is a plot of storage modulus (Pa) as a function of temperature of a cast structure formed with matrix+$T_g44$ microballoons (i.e., 40 vol. % $T_g44$ microballoon structure). As shown in FIG. 7, at temperatures between 100° C. and 110° C., there was a pronounced reduction in storage modulus thereby representing a shape memory actuation of the cast 40 vol % $T_g44$ microballoon structure.

3D Printed Structures Having Expanded Gas-Filled Microballoons Post-Processing

FIGS. 13A and 13B depict images of structures printed with a low density ink having unexpanded gas-filled microballoons. Each low density ink including unexpanded gas-filled microballoons was used in DIW printing to form hexagonal closed packed (HCP) lattices on glass slides prior to thermal and negative pressure processing. FIG. 13A depicts images of a low density ink having 5 wt. % unexpanded gas-filled microballoons at lower magnification (part (a)) and higher magnification (part (b)). FIG. 13B depicts images of low density ink having 7 wt. % unexpanded gas-filled microballoons at lower magnification (part (a)) and higher magnification (part (b)).

Figure 14A:
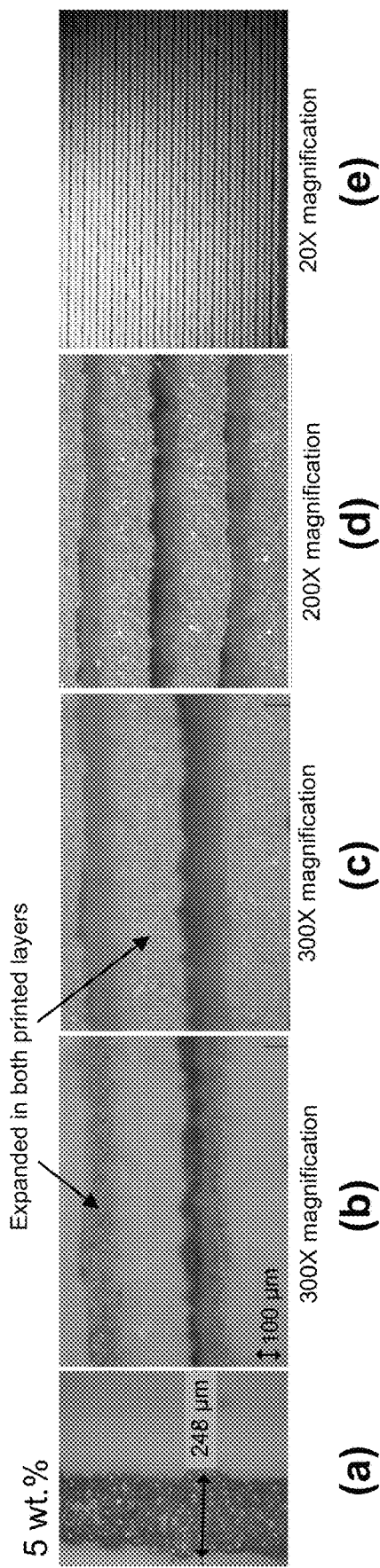
FIG. 14A is a series of images of filaments comprising a siloxane matrix and 5 wt. % gas-filled microballoon, the microballoons expanded after post processing at an elevated temperature and negative pressure, according to one embodiment. Part (a) is an image of a top down view of a filament having expanded gas-filled microballoons, parts (b) and (c) are a series of images of a top down view of a length of several filaments having expanded gas-filled microballoons at 300× magnification, part (d) is an image of several filaments at 200× magnification, part (e) is an image of a plurality of filaments at 20× magnification.
Figure 14B:
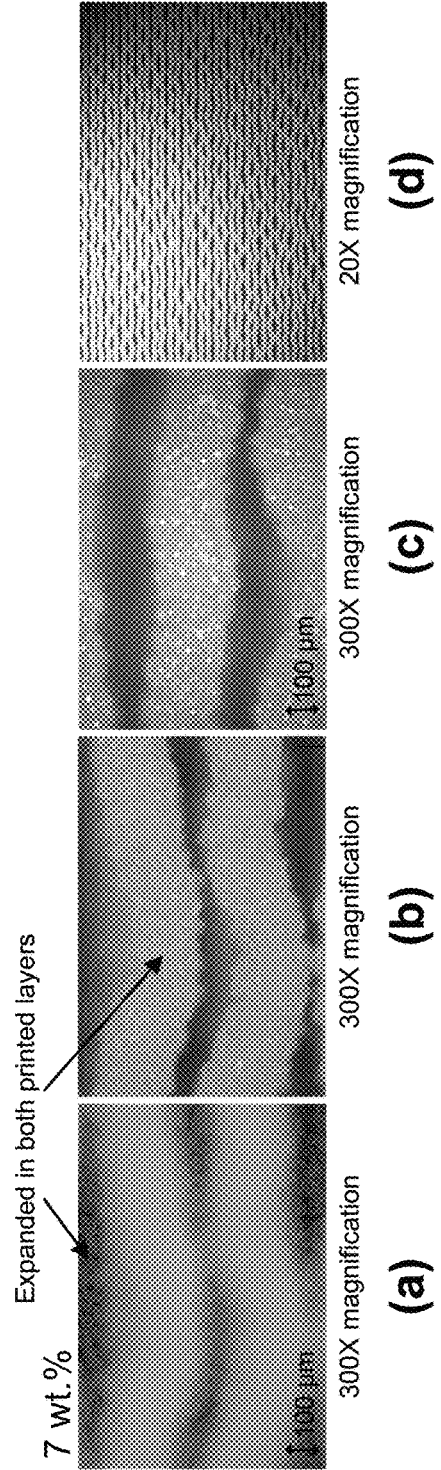
FIG. 14B is a series of images of filaments comprising a siloxane matrix and 7 wt. % gas-filled microballoon, the microballoons expanded post processing at an elevated temperature and negative pressure, according to one embodiment. Parts (a-c) are a series of images of a top down view of a length of several filaments having expanded gas-filled microballoons at 300× magnification, part (d) is an image of a plurality of filaments at 20× magnification.

FIGS. 14A and 14B depict images of extruded filaments printed with low density inks having unexpanded gas-filled microballoons followed by expansion of the microballoons post processing. The ink loaded with unexpanded gas-filled microballoons was printed using an extrusion-based system having a 250 μm tip nozzle. The initial diameter of the bead at extrusion was 180 µm. The extruded filament structures was post processed at an elevated temperature of about 80° C. and negative pressure. The average expanded final diameter of the extruded filaments was 250 µm. Total thickness of the three printed layers was 750 µm.

FIG. 14A depicts images of extruded filaments printed using a low density ink having 5 wt. % unexpanded gas-filled microballoons. Part (a) depicts a top down view of a single extruded filament having expanded gas-filled microballoons. Parts (b), (c), and (d) depict a top down view of the extruded filaments having expanded gas-filled microballoons at 300× magnification. Part (b) is an image with the focus on the layer positioned below the layer in focus in the image of part (c). Both images illustrate the gas-filled microballoons are expanded in both layers of the printed filaments. Part (e) depicts an image of a lower magnification at 20X of the raster printed filaments about parallel to each other.

FIG. 14B depicts images of extruded filaments printed using a low density ink having a higher concentration of unexpanded gas-filled microballoons at 7 wt. %. Parts (a), (b), and (c) depict a top down view of the extruded filaments having expanded gas-filled microballoons at 300× magnification. Part (a) is an image with the focus on the layer positioned below the layer in focus in the image of part (b). Both images illustrate the gas-filled microballoons are expanded in both layers of the printed filaments.

Moreover, the higher concentration of unexpanded gas-filled microballoons in the ink resulted in a sinusoidal pattern of the extruded filaments. The extrusion parameters for the ink having 5 wt. % unexpanded gas-filled microballoons and the ink having 7 wt. % unexpanded gas-filled microballoons were the same. Part (d) depicts an image of a lower magnification at 20X of the raster printed filaments about parallel to each other and having a distinct sinusoidal pattern compared to the lower magnification image of the filaments printed with 5 wt. % unexpanded gas-filled microballoons in part (e) of FIG. 14A.

Figure 15:
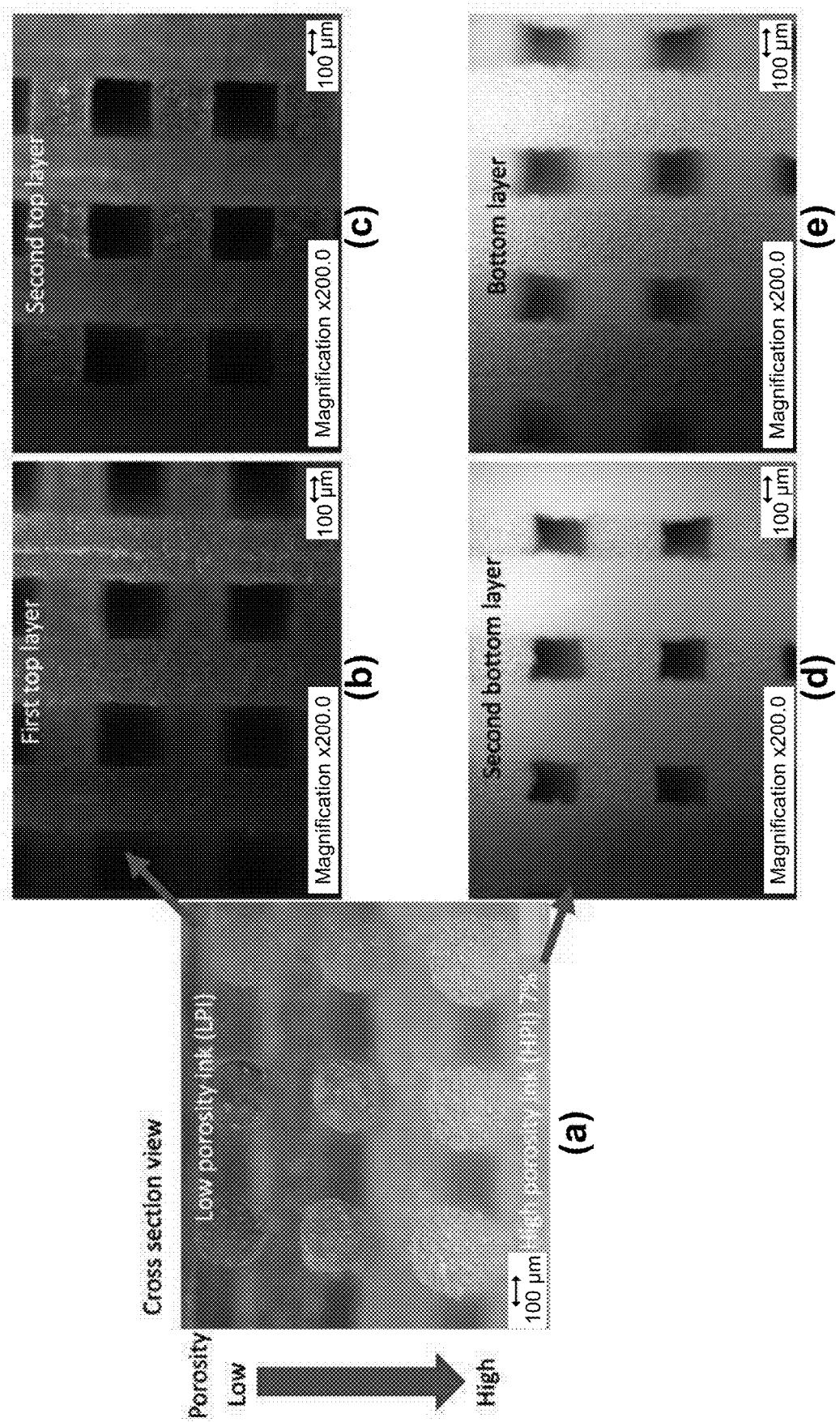
FIG. 15 is a series of images of a cross hatch printing of a gradient ink comprising a siloxane matrix and 7 wt. % gas-filled microballoons, the microballoons expanded post processing at an elevated temperature and negative pressure, according to one embodiment. Part (a) depicts a side view of the alternating layers of ink having a gradient of increasing porosity from the top of the structure to the bottom of the structure. Part (b) is a top down view of the low porosity layer as depicted in the low porosity filaments in a y-direction, "first top layer;" and part (c) is a top down view of the low porosity filaments in an x-direction, "second top layer." Part (d) is a top down view of the high porosity layer as depicted in the high porosity filaments in a x-direction, "second bottom layer;" and part (e) is a top down view of the high porosity filaments in a y-direction, "bottom layer."

FIG. 15 depicts images of a structure having inter-porosity and a gradient of intra-porosity. A log-pile structure was formed using an ink mixture that includes Ink B having 7 wt. % unexpanded gas-filled balloons. Each layer included a different ratio of Ink A (no unexpanded microballoons) to Ink B, such that the top layers included less of the unexpanded gas-filled microballoon content. A portion of the structure, e.g., a printed coupon, was isolated for imaging the inter-filament porosity created by the log-pile structure of the printed filaments. Following expansion of the gas-filled microballoons by heating the material at 80° C. for about 8 hours, the printed filaments of the coupon created a gradient of intra-filament porosity in which the bottom layer of the coupon had a higher porosity that decreased to a lower porosity in the upper layers of the printed coupon. The dimensions of the printed beads forming the filaments included an average diameter between 200 to 250 µm.

Part (a) is an image of a cross-section of the coupon post processing that shows the arrangement of printed filaments form a gradient of porosity where the printed filaments of the bottom layers comprise a material formed with a higher porosity ink, and the printed filaments of the top layers comprise a material formed with a lower porosity ink. The images depicted in parts (b) and (c) depict a top-down view of the printed coupon where the uppermost top layer, identified as "first top layer," is in focus in part (b) and the layer below the uppermost top layer, identified as "second top layer," is in focus in part (c). In each image, the expanded gas-filled microballoons are distributed in a lower concentration resulting in a lower intra-filament porosity.

The images depicted in parts (d) and (e) depict a bottom-up view of the printed coupon where the lowermost "bottom layer" is in focus in part (e) and the layer above the lowermost bottom layer, indicated on the image as "second bottom layer" is in focus in part (d). In each image, the expanded gas-filled microballoons are distributed in a higher concentration resulting in a higher intra-filament porosity.

Figure 16:
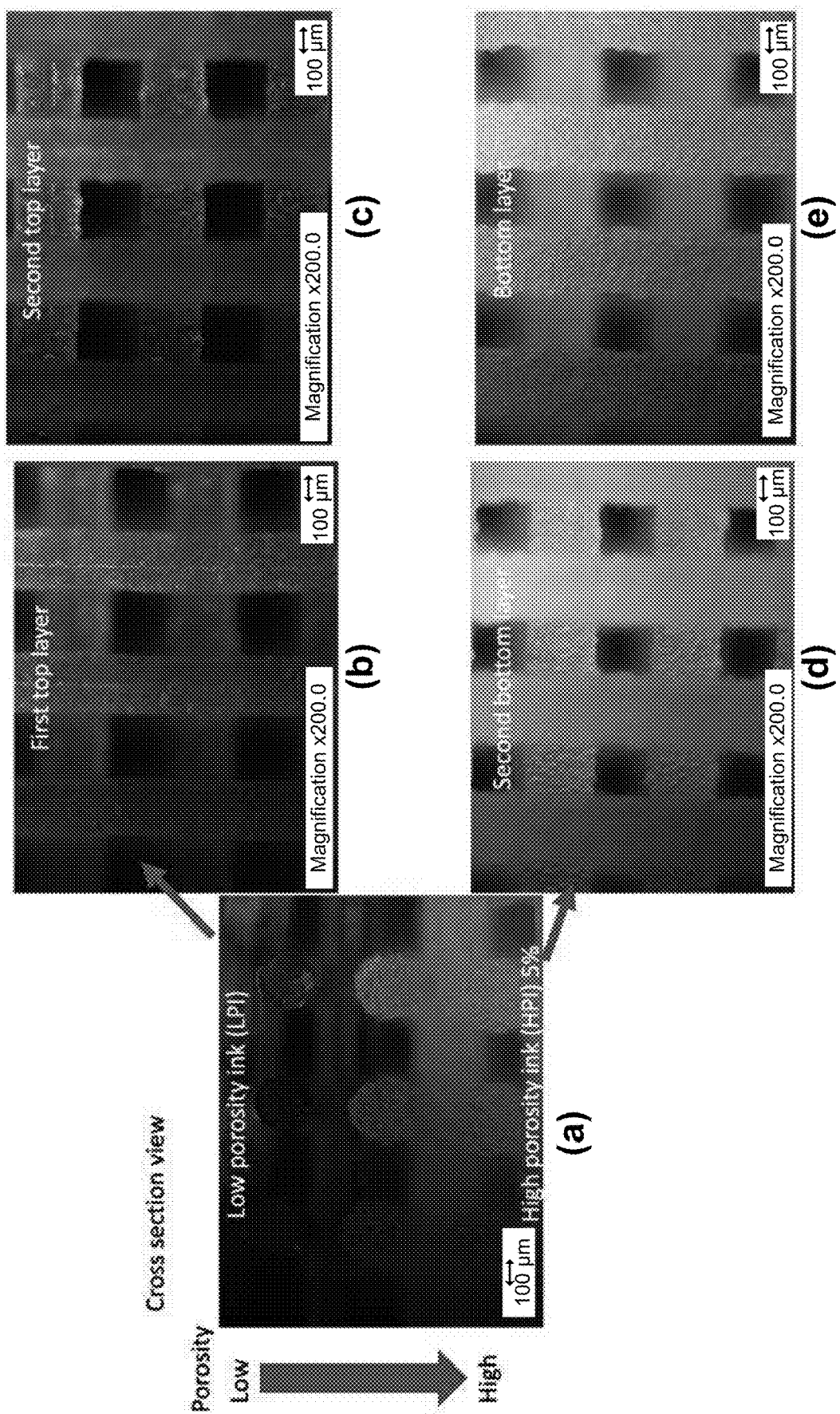
FIG. 16 is a series of images of a cross hatch printing of a gradient ink comprising a siloxane matrix and 5 wt. % gas-filled microballoons, the microballoons expanded post processing at an elevated temperature and negative pressure, according to one embodiment. Part (a) depicts a side view of the alternating layers of ink having a gradient of increasing porosity from the top of the structure to the bottom of the structure. Part (b) is a top down view of the low porosity layer as depicted in the low porosity filaments in a y-direction, "first top layer;" and part (c) is a top down view of the low porosity filaments in an x-direction, "second top layer." Part (d) is a top down view of the high porosity layer as depicted in the high porosity filaments in a x-direction, "second bottom layer;" and part (e) is a top down view of the high porosity filaments in a y-direction, "bottom layer."

FIG. 16 depicts images of a structure having inter-porosity and a gradient of intra-porosity. A log-pile structure was formed using an ink mixture that includes Ink B having 5 wt. % unexpanded gas-filled balloons. Each layer included a different ratio of Ink A (no unexpanded microballoons) to Ink B, such that the top layers included less of the unexpanded gas-filled microballoon content. A portion of the structure, e.g., a printed coupon, was isolated for imaging the inter-filament porosity created by the log-pile structure of the printed filaments. Following expansion of the gas-filled microballoons by heating the material at 80° C. for about 8 hours, the printed filaments of the coupon created a gradient of intra-filament porosity in which the bottom layer of the coupon had a higher porosity that decreased to a lower porosity in the upper layers of the printed coupon. The dimensions of the printed beads forming the filaments included an average diameter between 200 to 250 µm.

Part (a) is an image of a cross-section of the coupon post processing that shows the arrangement of printed filaments form a gradient of porosity where the printed filaments of the bottom layers comprise a material formed with a higher porosity ink, and the printed filaments of the top layers comprise a material formed with a lower porosity ink. The images depicted in parts (b) and (c) depict a top-down view of the printed coupon where the uppermost top layer, identified as "first top layer," is in focus in part (b) and the layer below the uppermost top layer, identified as "second top layer," is in focus in part (c). In each image, the expanded gas-filled microballoons are distributed in a lower concentration resulting in a lower intra-filament porosity.

The images depicted in parts (d) and (e) depict a bottom-up view of the printed coupon where the lowermost "bottom layer" is in focus in part (e) and the layer above the lowermost bottom layer, indicated as "second bottom layer" is in focus in part (d). In each image, the expanded gas-filled microballoons are distributed in a higher concentration resulting in a higher intra-filament porosity.

In Use

Various embodiments described herein may be used in protective gear which deforms/activates at body temperatures, in cushions and pads deployed in small and or complicated spaces, in complex structures requiring shape memory behavior (elastomer and microballoon in conjunction with 3D printing), etc.

For example, the material described herein may be used in a helmet or shoe inserts or any other cushioning element where a customized fit is desired. The material may be heated, fit around a custom mold (e.g., a person's head or foot), and then the form may be cooled back to use temperature, thereby creating a custom form-fitting cushion.

Various embodiments described herein provide variable porosity of polymeric materials in application such as graded bioimplants, ultra-high porosity elastomeric materials, for example sound dampening materials, thermal barriers, variable porosity cushions (e.g., foam mattress, shoe soles or inserts having variable support and/or relaxation within the same product, bicycle or football helmets, etc. Some embodiments include applications of elastomeric materials with controlled local porosity desiring both stiffness and flexibility within one product and without the use of two different resin chemistries thereby eliminating delamination issues and mechanical defects within an additively manufactured part.

The inventive aspects disclosed herein have been presented by way of example to illustrate the myriad features thereof in a plurality of illustrative scenarios, embodiments, and/or implementations. It should be appreciated that the aspects generally disclosed are to be considered as modular, and may be implemented in any combination, permutation, or synthesis thereof. In addition, any modification, alteration, or equivalent of the presently disclosed features, functions, and aspects that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments but should be defined only in accordance with the following claims and their equivalents.

What is claimed is:

1. A product, comprising:
    a porous three-dimensional printed structure having printed filaments arranged in a geometric pattern, the printed filaments comprising a material having a plurality of gas-filled microballoons,
    wherein the printed structure has an intra-filament porosity in at least one printed filament thereof, the intra-filament porosity being defined by a compositional gradient and/or a concentration gradient of the gas-filled microballoons in the material,
    wherein the compositional gradient of the material comprises a first composition of the gas-filled microballoons relative to a second composition of the gas-filled microballoons, wherein the gas-filled microballoons of the first composition have a first glass transition temperature and the gas-filled microballoons of the second composition have a second glass transition temperature different than the first glass transition temperature.

2. The product as recited in claim 1, wherein the printed structure has elastomeric shape memory behavior.

3. The product as recited in claim 1, wherein the printed structure, following recovery from compression resulting in at least a 60% reduction in original thickness, has at least 97% structure porosity compared to a porosity of the structure before compression.

4. The product as recited in claim 3, wherein the printed structure comprises pre-defined zones of porosity, wherein a first zone of porosity has at least 97% elastomeric shape memory behavior compared to an original shape of the structure, wherein a second zone of porosity has a different elastomeric shape memory behavior than the first zone of porosity.

5. The product as recited in claim 1, wherein the intra-filament porosity is in a range of greater than 0 vol. % to about 98 vol. % relative to a total volume of the material.

6. A product, comprising:
    a porous three-dimensional printed structure having printed filaments arranged in a geometric pattern, the printed filaments comprising a material having a plurality of gas-filled microballoons,
    wherein the printed structure has an intra-filament porosity in at least one printed filament thereof, the intra-filament porosity being defined by a compositional gradient and/or a concentration gradient of the gas-filled microballoons in the material,
    wherein the printed structure has a pre-defined gradient of porosity resulting from the arrangement of the printed filaments, and wherein at least some of the printed filaments have a gradient of intra-filament porosity.

7. A product, comprising:
    a porous three-dimensional printed structure having printed filaments arranged in a geometric pattern, the printed filaments comprising a material having a plurality of gas-filled microballoons,
    wherein the printed structure has hierarchical porosity comprising: an inter-filament porosity defined by the arrangement of the printed filaments, and
    an intra-filament porosity of the material, the intra-filament porosity defined by the plurality of gas-filled microballoons in the material of the printed filaments,
    wherein at least some of the printed filaments are arranged about parallel to each other, the at least some of the printed filaments having a shape corresponding to a periodic wave pattern.

* * * * *